(12) United States Patent
Katase

(10) Patent No.: US 7,270,423 B2
(45) Date of Patent: Sep. 18, 2007

(54) PROJECTION DISPLAY

(75) Inventor: Makoto Katase, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 11/077,078

(22) Filed: Mar. 11, 2005

(65) Prior Publication Data

US 2005/0206854 A1 Sep. 22, 2005

(30) Foreign Application Priority Data

Mar. 19, 2004 (JP) ............................. 2004-081606

(51) Int. Cl.
*G03B 21/30* (2006.01)
*G03B 21/58* (2006.01)
(52) U.S. Cl. .................. 353/79; 353/71; 353/119; 348/794; 348/788; 359/449
(58) Field of Classification Search ................. 353/47, 353/50, 71, 72, 74, 77, 79, 119; 348/781–788, 348/794; 359/451, 449, 460, 461
See application file for complete search history.

(56) References Cited

U.S. PATENT DOCUMENTS 5,491,585 A * 2/1996 Dolgoff ...................... 359/449
5,580,146 A * 12/1996 Maslow ........................ 353/74
6,369,943 B1 * 4/2002 Bachmann et al. .......... 359/445
6,525,750 B1 * 2/2003 Knox ........................... 345/30
6,637,896 B2 * 10/2003 Li et al. ....................... 353/119
2002/0118151 A1 * 8/2002 Chen ........................... 345/84

FOREIGN PATENT DOCUMENTS

JP    A 05-040318    2/1993

* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

To provide a projection display that can easily switch between rear and front projection modes with a transmission screen, a projector, and a mirror exposed to the outside, a projection display has a projector to project projection light applied to a display image, a mirror to introduce the projection light from the projector, a screen to allow the projection light introduced by the mirror to pass through from the rear to project light in a rear mode, and a frame to hold the projector and the screen. The projection display has the screen, the projector, and the mirror exposed to the outside, and the projector is installed so that it can be attached to and detached from the frame.

12 Claims, 24 Drawing Sheets

F I G. 4
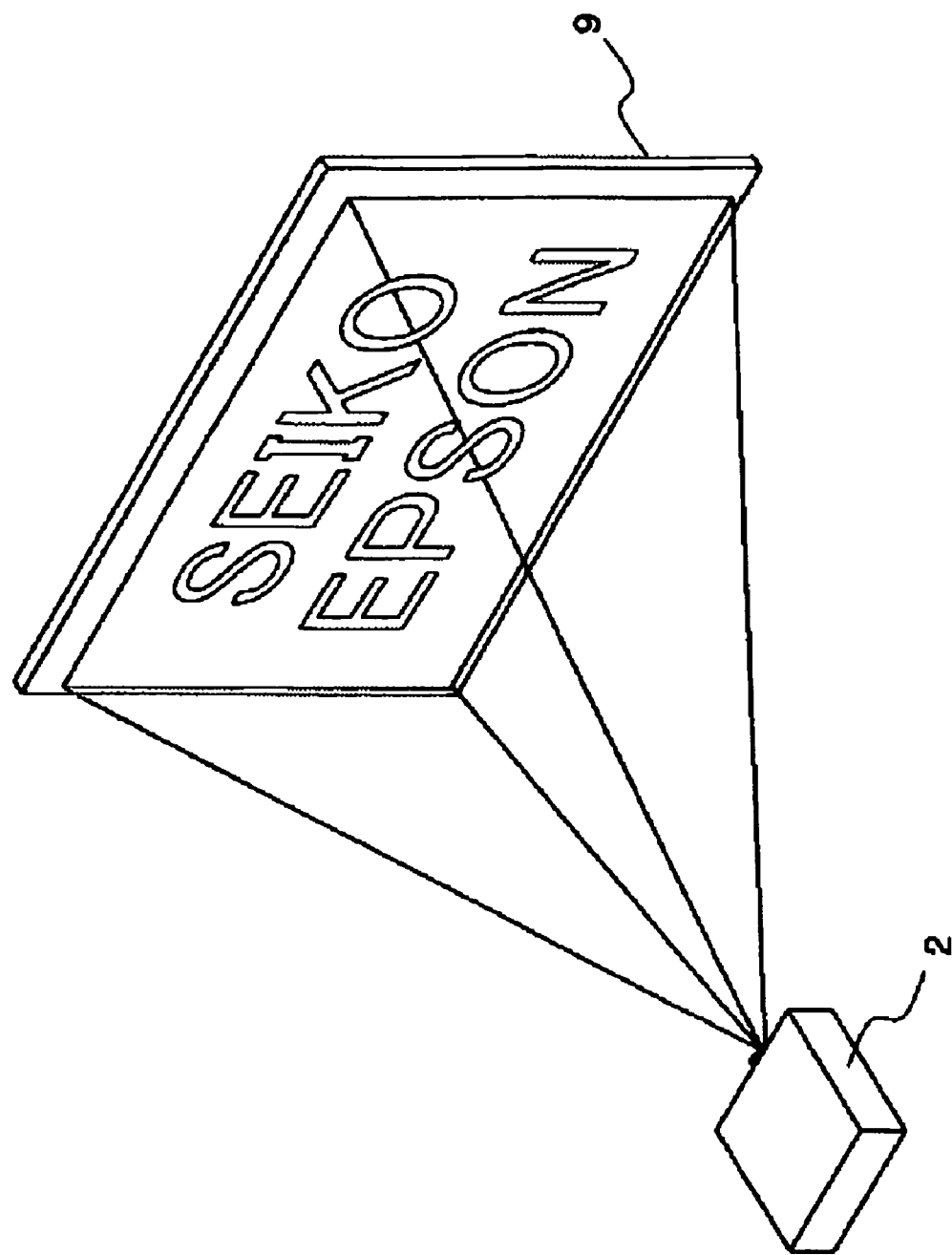

F I G. 5
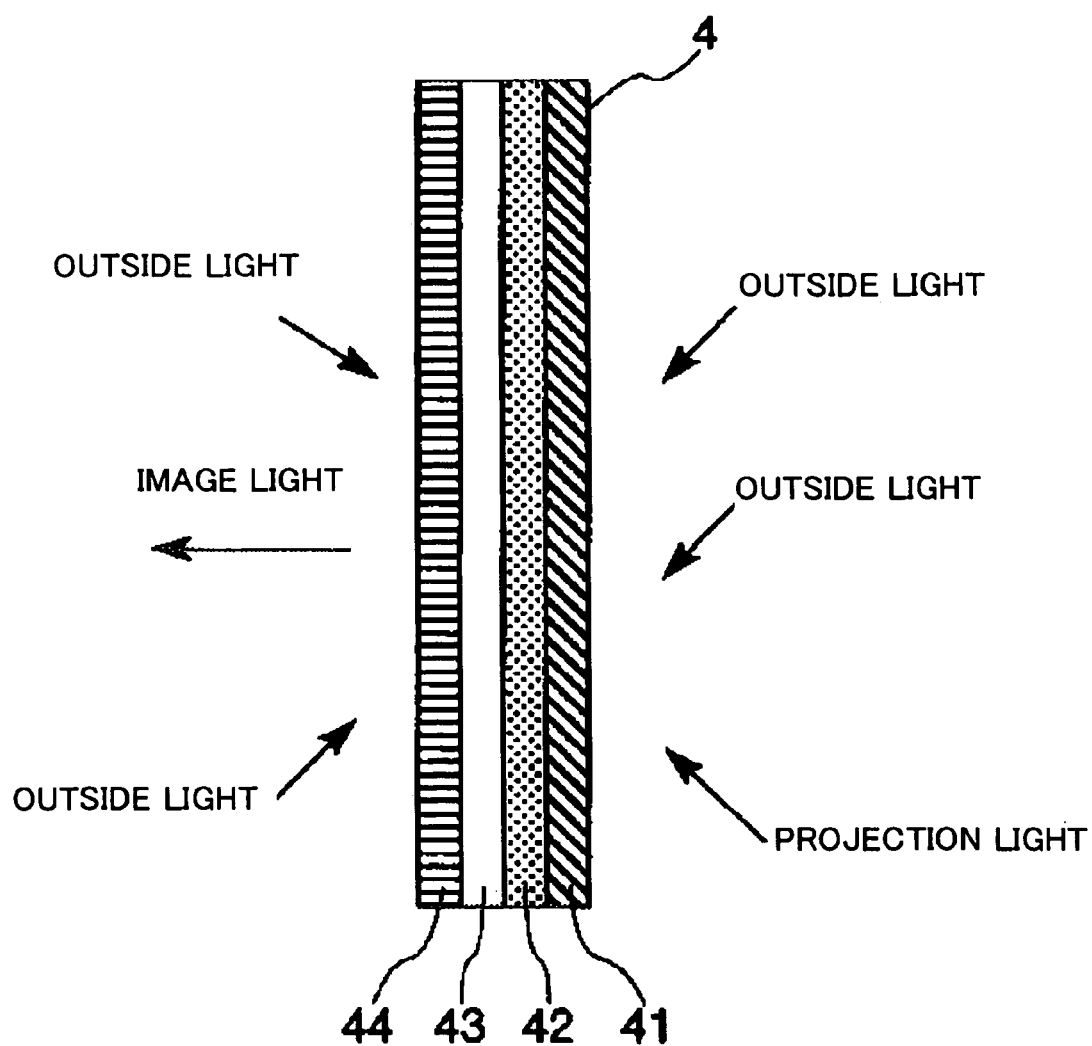

F I G. 6
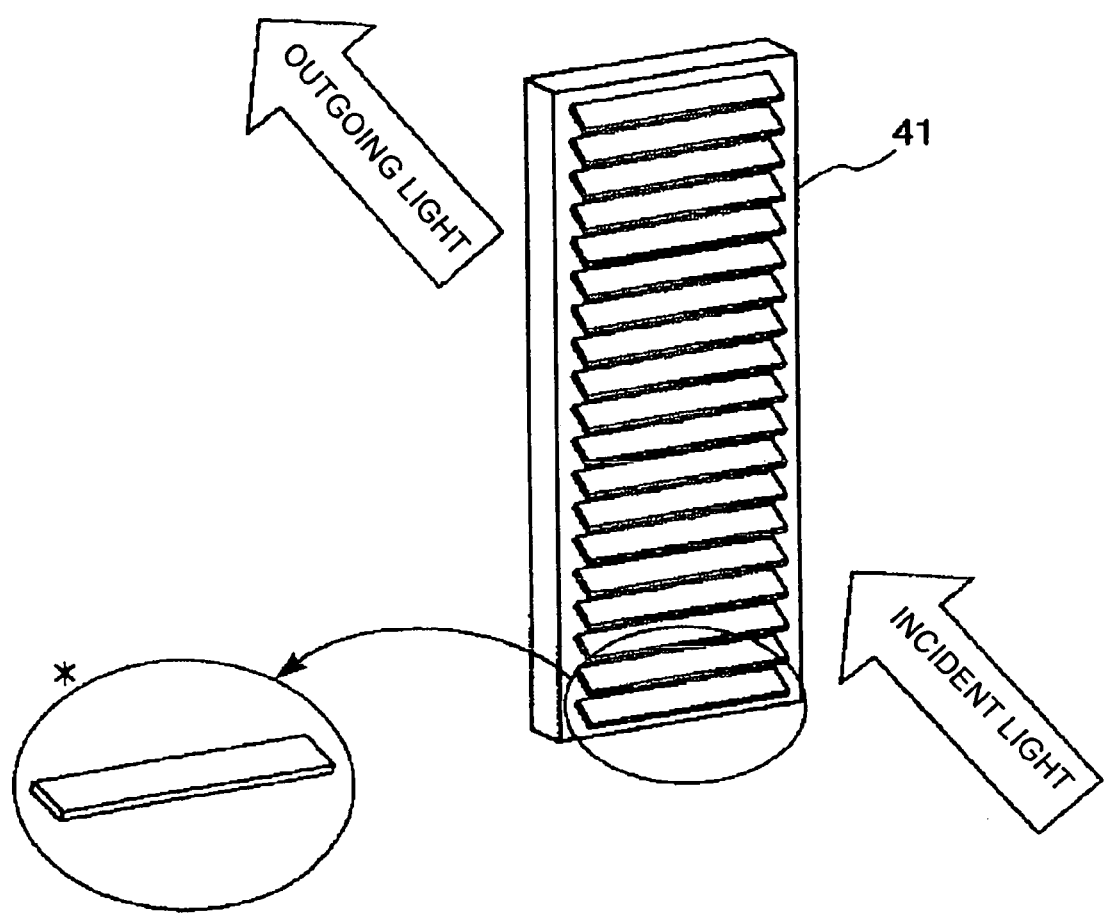

F I G. 11
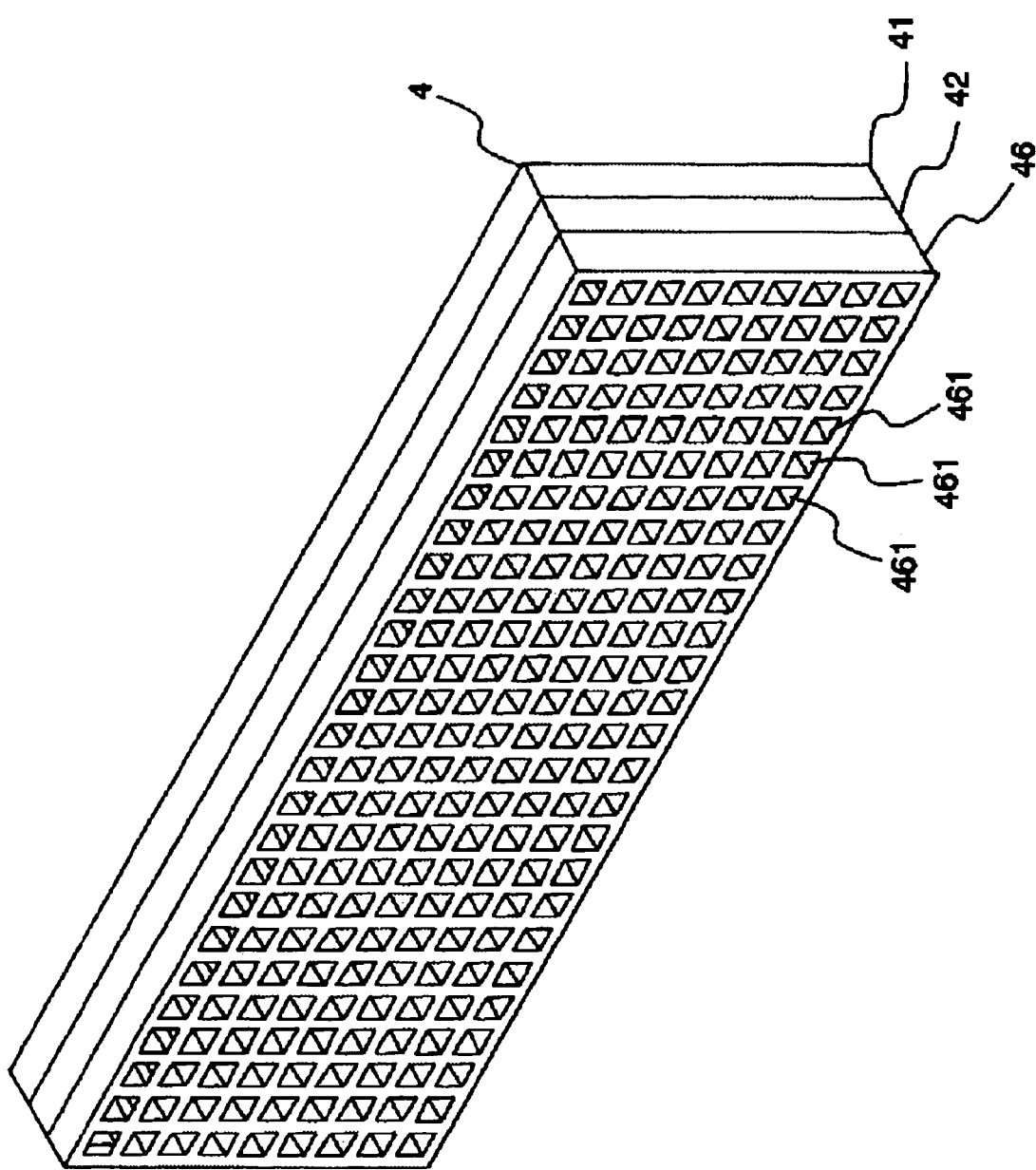

F I G. 13
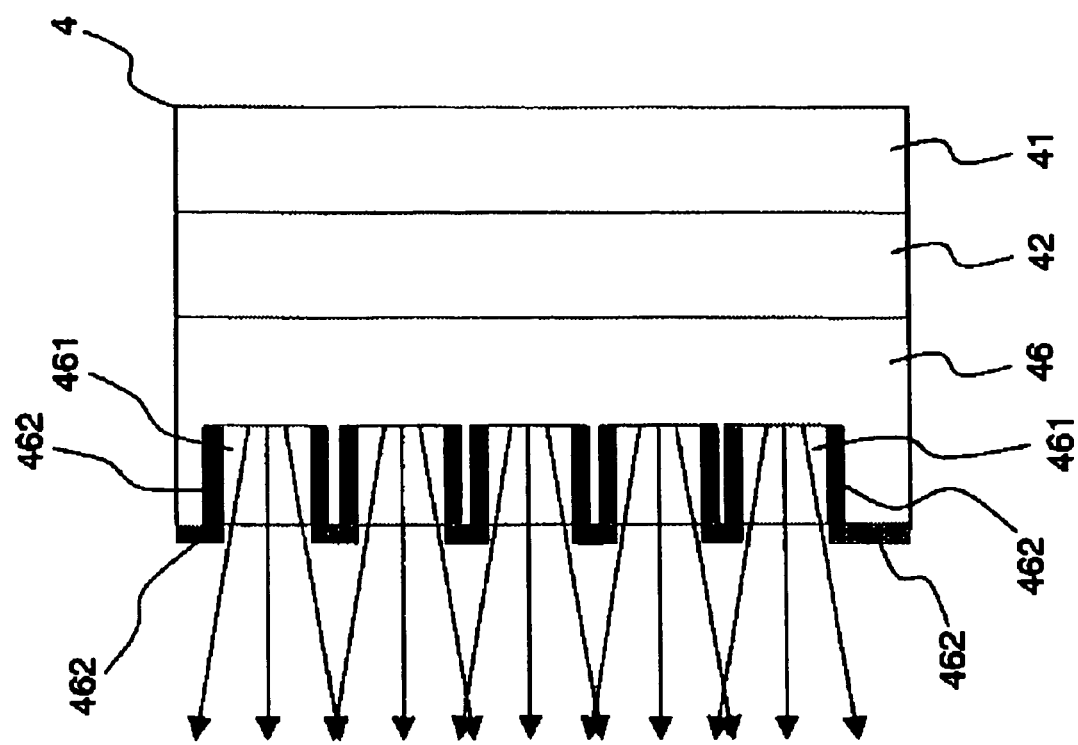

F I G. 16
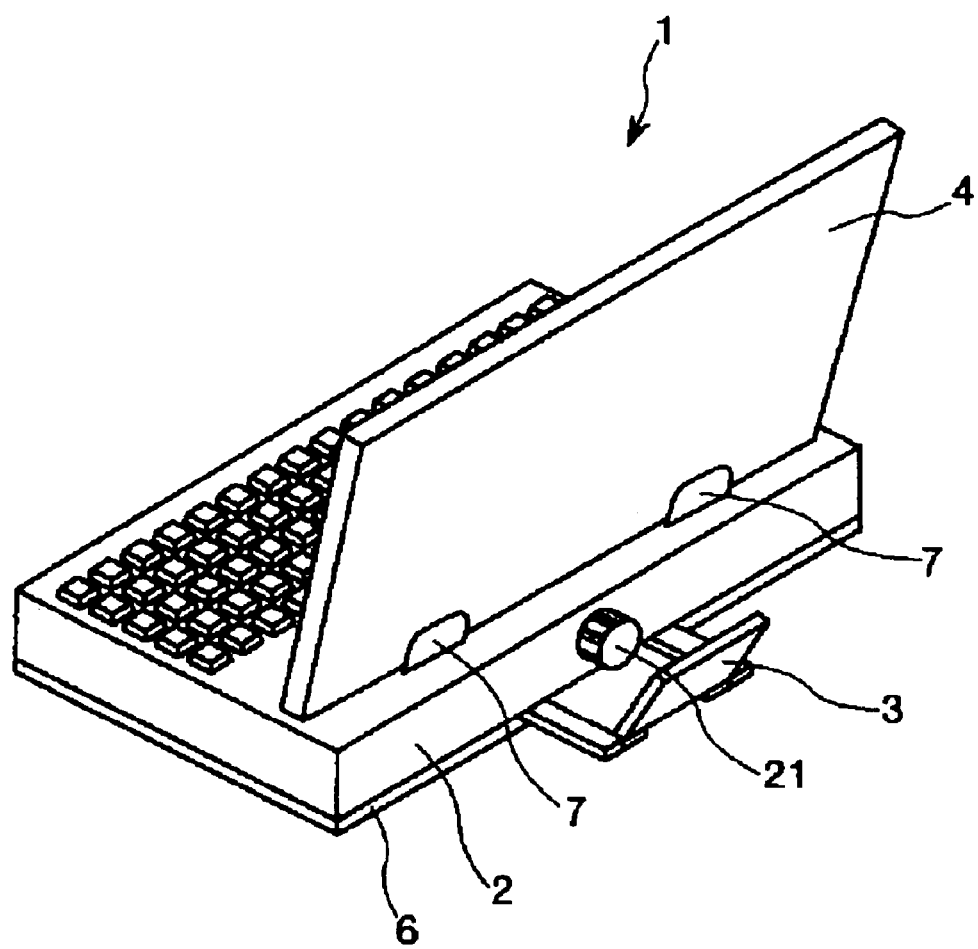

F I G. 17
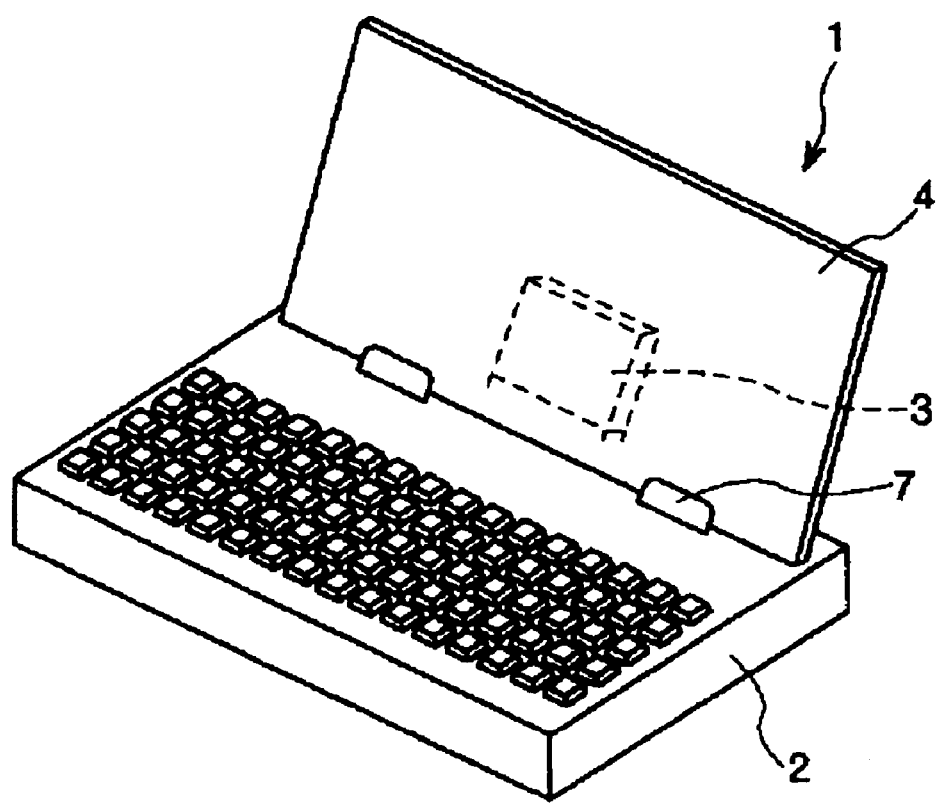

F I G. 18
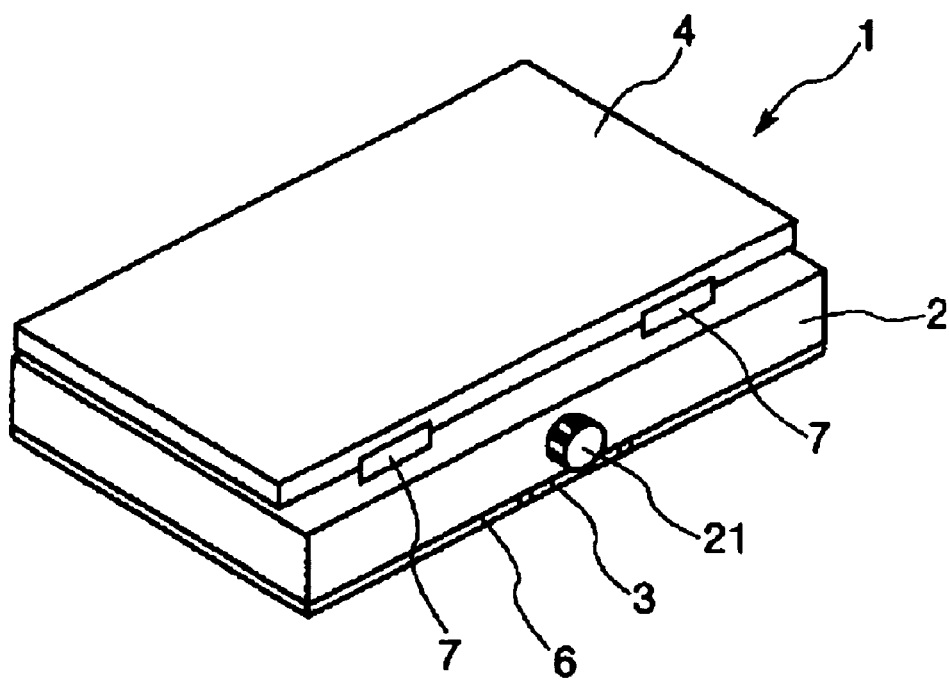

F I G. 19
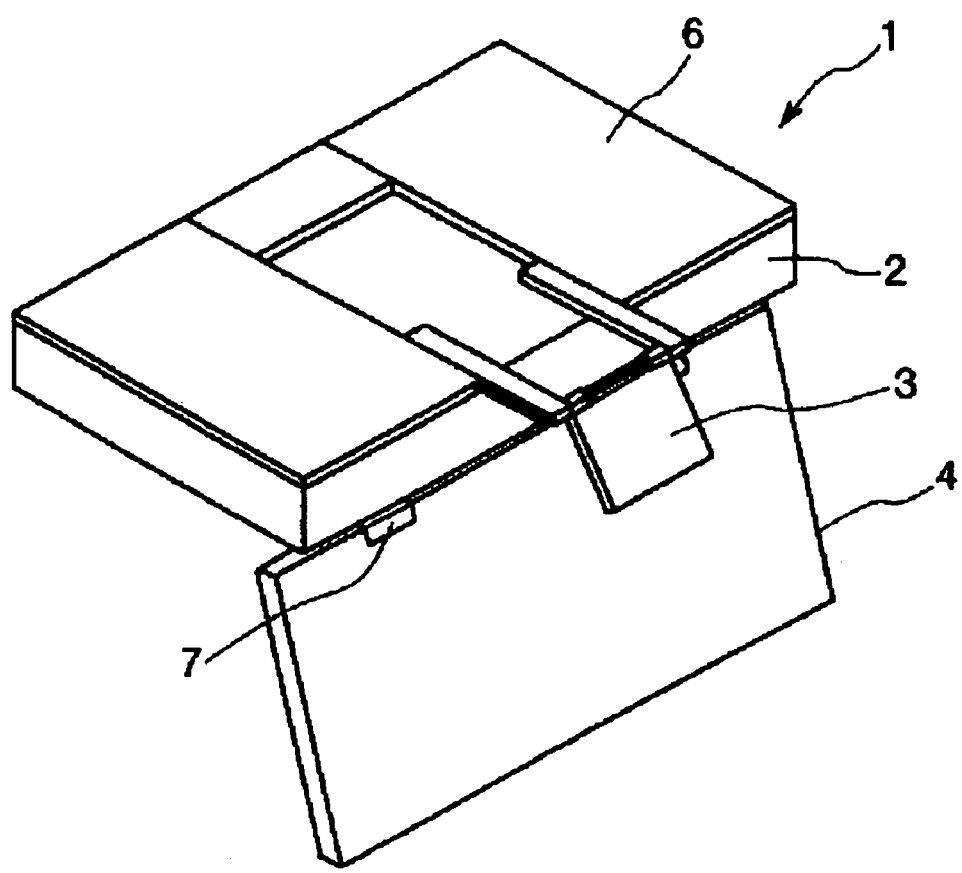

F I G. 20
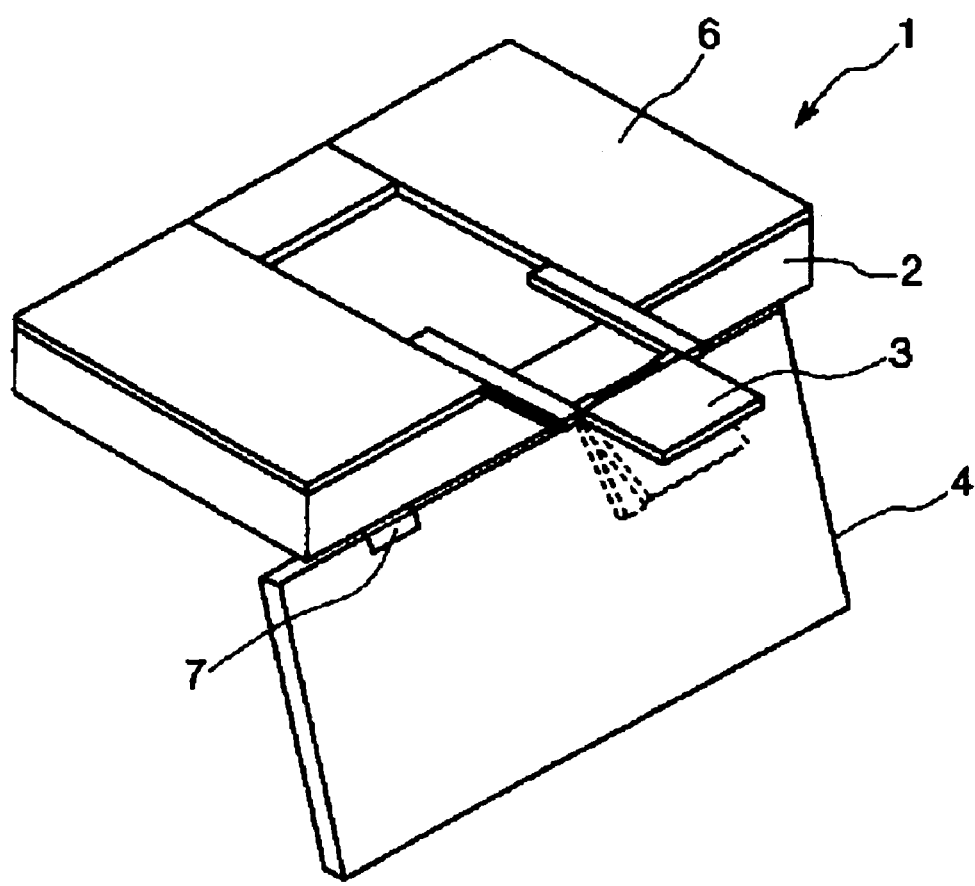

F I G. 21
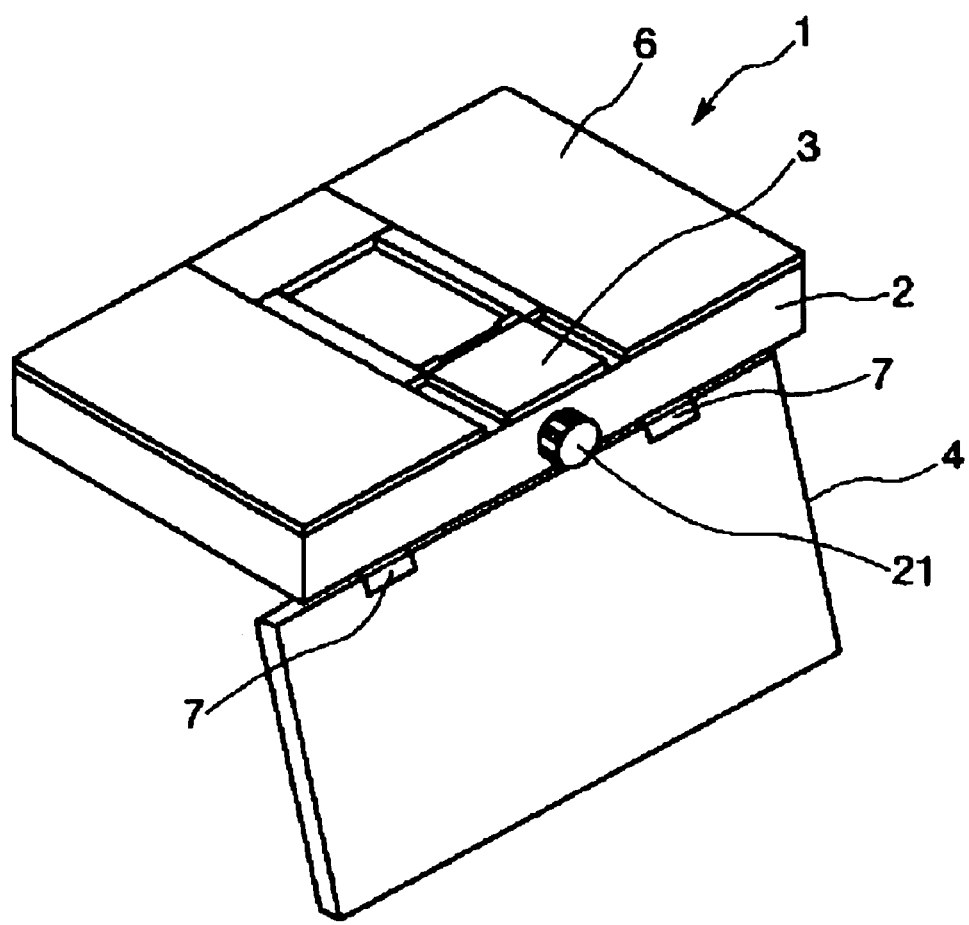

F I G. 23
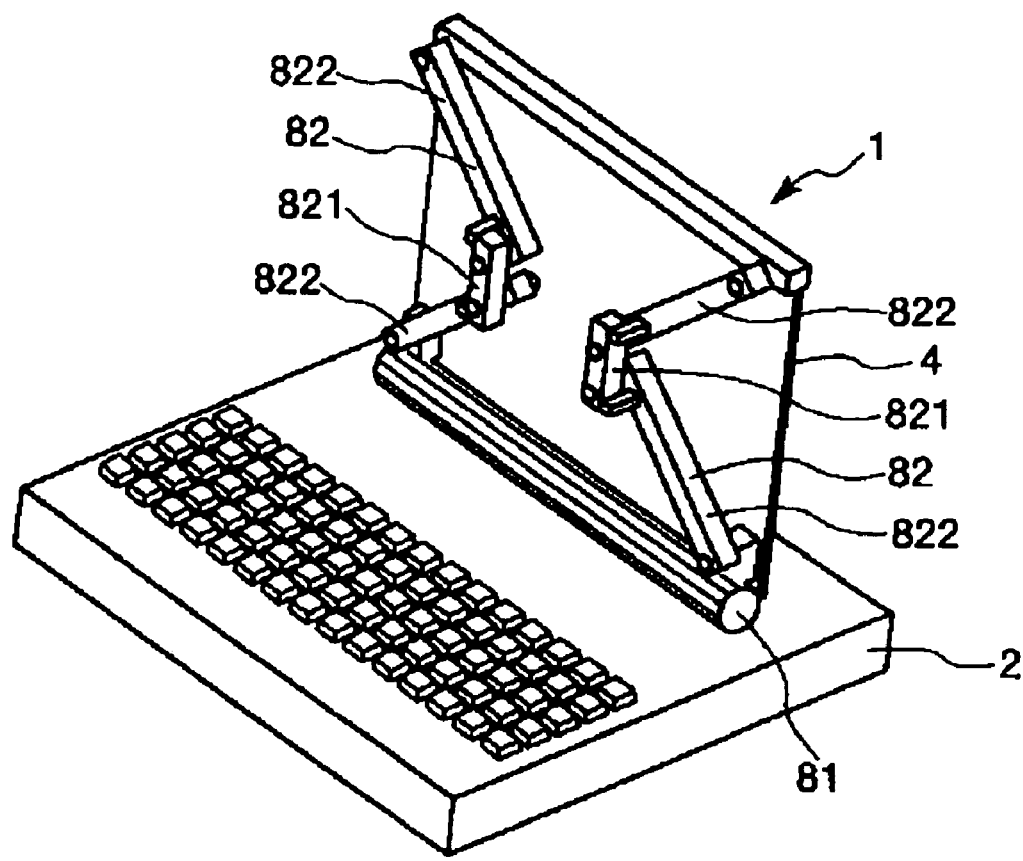

PROJECTION DISPLAY

BACKGROUND

Exemplary aspects of this invention relate to a projection display.

To project an image in a projection display adopting a front projection mode, the projection distance from a projector to a screen can be made large because of the configuration, so that a large image can be displayed. To project an image in a projection display adopting a rear projection mode, the need for considering an obstacle (human being, furniture, etc.,) in the projection path, as in the front projection mode, can be eliminated although the image that can be displayed is small. Thus, a projection display that can switch between the front and rear projection modes is very convenient to use because it can be used in response to the installation space, etc.

A related art projection display is disclosed in JP-A-5-40318. The related art projection display has a projector, a cabinet for housing an optical system (lens, mirror, etc.,), and a screen installed on the cabinet. The projector is installed detachably in a part of the cabinet. In the rear projection mode, the projector is used in a state in which it is installed in the cabinet, and projection light from the projector is projected onto the screen through the optical system in the cabinet, whereby a display image is provided on the screen. In the front projection display mode, the projector is detached from the cabinet and is placed at the front of the screen and projection light is projected onto the screen, whereby a display image is provided on the screen. The configuration enables the related art projection display to switch between the front and rear projection modes.

The cabinet covers the rear of the screen, thereby excluding outside light incident on the screen when the projection display is used in the rear projection mode. Accordingly, the effect of the outside light is suppressed, the contrast of a display image is enhanced, and a clear image is formed on the screen. Therefore, in the related art projection display, the cabinet is an indispensable component to ensure the contrast of the display image.

However, the related art projection display is upsized because of the cabinet and has the problem of requiring a large installation space.

SUMMARY

Exemplary aspects of the invention provide a projection display that can easily switch between rear and front projection modes with a transmission screen, a projector, and a mirror exposed to the outside.

Exemplary aspects of the invention, a projection display include a transmission screen having a light transmission property and including a rear layer having light directivity on the rear; a projector being capable of projecting projection light; a mirror to introduce projection light from the projector into the rear of the transmission screen; a frame to support the transmission screen, the projector, and the mirror; and a support mechanism to support the projector so that the projector can be attached to and detached from the frame.

The transmission screen, the projector, and the mirror are exposed to the outside. To project light in a rear mode, the projection light introduced by the mirror is allowed to pass through from the rear with the projector attached to the frame to display an image on the transmission screen. To project light in a front mode, the projection light from the projector is projected onto a reflection screen with the projector detached from the frame, thereby displaying an image on the reflection screen.

Using the transmission screen including the rear layer having light directivity on the rear, to project light in the rear mode, the projection light introduced through the mirror from the projector can be reliably introduced into the transmission screen. Outside light, other than the projection light, can be reduced or prevented, so that the contrast of the display image can be enhanced. Accordingly, a cabinet required in the related art can be omitted and the projection display with the transmission screen, the projector, and the mirror exposed to the outside can be provided. To project light in the front mode, the projector is removed, whereby transporting the projector is facilitated and an image can be easily projected onto any desired projection target, such as a reflection screen.

The projection display of an exemplary aspect of the invention may include a screen switch to switch between a mode in which the transmission screen is positioned on an optical path of the projection light in the rear mode and a mode in which the transmission screen is placed out of the optical path of the projection light in the front mode.

Accordingly, the projection display can be switched between the front and rear modes.

According to an exemplary aspect of the invention, there is provided a projection display including: a transmission screen having a light transmission property and including a rear layer having light directivity on the rear; a projector being capable of projecting projection light; a mirror to introduce projection light from the projector into the rear of the transmission screen; a frame to support the transmission screen, the projector, and the mirror; and a front/rear switch device to switch between rear and front projection modes. To project light in the rear mode, the projection light introduced by the mirror is allowed to pass through from the rear to display an image on the transmission screen. To project light in the front mode, the projection light from the projector is projected onto a reflection screen, thereby displaying an image on the reflection screen.

The transmission screen, the projector, and the mirror are exposed to the outside.

A screen switch to switch between a mode in which the transmission screen is positioned on an optical path of the projection light in the rear mode and a mode in which the transmission screen is placed out of the optical path of the projection light in the front mode.

Using the transmission screen including the rear layer having light directivity on the rear, to project light in the rear mode, the projection light introduced through the mirror from the projector can be reliably introduced into the transmission screen. Outside light, other than the projection light, can be reduced or prevented. Accordingly, the projection display with the transmission screen, the projector, and the mirror exposed to the outside can be provided. As the screen switch is included, the projection display can be switched easily and reliably between the mode in which the projection light onto the transmission screen from the projector is positioned on the transmission screen and the mode in which the projection light is placed out of the transmission screen.

In the projection display of an exemplary aspect of the invention, the screen switch may be a support mechanism to support the transmission screen so that the transmission screen can be attached to and detached from the frame.

Accordingly, the projection display can be switched easily and reliably between the mode in which the transmission screen is positioned on the optical path of the projection light of the projector in the rear mode and the mode in which the transmission screen is placed out of the optical path of the projection light in the front mode.

In the projection display of an exemplary aspect of the invention, the screen switch may be a support mechanism to support the transmission screen so that the transmission screen can be folded relative to the frame.

Accordingly, the projection display can be switched easily and reliably between the mode in which the transmission screen is positioned on the optical path of the projection light of the projector in the rear mode and the mode in which the transmission screen is placed out of the optical path of the projection light in the front mode.

In the projection display of an exemplary aspect of the invention, the transmission screen may have flexibility and the screen switch is a support mechanism to support the transmission screen so that the transmission screen can enter an unfolded state and a storage state.

Accordingly, for example, the transmission screen can be rolled easily and reliably and the projection display can be switched easily and reliably between the mode in which the transmission screen is positioned on the optical path of the projection light of the projector in the rear mode and the mode in which the transmission screen is placed out of the optical path of the projection light in the front mode.

In the projection display of an exemplary aspect of the invention, the projection display may include a support mechanism to support the mirror so that the mirror can be attached to and detached from the frame.

At the transport time, the mirror can be detached from the frame and can be transported separately, so that transporting the display is facilitated.

The projection display of an exemplary aspect of the invention may further include a support mechanism to support the mirror so that the mirror is slid into the frame for storage.

Accordingly, the mirror can be easily stored in the frame and transporting the display is facilitated.

According to an exemplary aspects of the invention, there is provided a projection display including: a transmission screen having a light transmission property and including a rear layer having light directivity on the rear; a projector being capable of projecting projection light; a mirror to introduce projection light from the projector into the rear of the transmission screen; and a frame to support the transmission screen, the projector, and the mirror. The transmission screen, the projector, and the mirror are exposed to the outside. A mirror switch to switch between a mode in which the mirror is positioned on an optical path of the projection light and a mode in which the mirror is placed out of the optical path of the projection light.

To project light in a rear mode, the mode in which the mirror is positioned on the optical path of the projection light is set by the mirror switch to allow the projection light introduced by the mirror to pass through from the rear to display an image on the transmission screen, and to project light in a front mode, the mode in which the mirror is placed out of the optical path of the projection light is set by the mirror switch to project the projection light from the projector onto a reflection screen, thereby displaying an image on the reflection screen.

Using the transmission screen including the rear layer having light directivity on the rear, to project light in the rear mode, the projection light introduced through the mirror from the projector can be reliably introduced into the transmission screen and light from any other direction can be reflected. Accordingly, the projection display with the transmission screen, the projector, and the mirror exposed to the outside can be provided. As the mirror switch is included, the projection display can be switched easily and reliably between the mode in which the projection light from the projector is positioned on the transmission screen and the mode in which the projection light is positioned on the reflection screen.

In the projection display of an exemplary aspect of the invention, the mirror switch may be a support mechanism to support the mirror so that the mirror can be attached to and detached from the frame. To project light in the front mode, the mirror is detached from the frame, thereby setting the mode in which the mirror is placed out of the optical path of the projection light. To project light in the rear mode, the mirror is attached to the frame, thereby setting the mode in which the mirror is positioned on the optical path of the projection light.

Accordingly, the optical path of the projector in the transmission screen can be switched easily and reliably.

In the projection display of an exemplary aspect of the invention, the mirror switch may be a support mechanism to support the mirror so that the mirror can be stored in the frame. To project light in the front mode, the mirror is slid into the frame for storage, thereby setting the mode in which the mirror is placed out of the optical path of the projection light and to project light in the rear mode, the mode in which the mirror is positioned on the optical path of the projection light is set.

Accordingly, the optical path of the projector in the transmission screen can be switched easily and reliably. The display can be miniaturized.

In the projection display of an exemplary aspect of the invention, the projection light may be projected onto the transmission screen from a direction inclined at a predetermined angle and the inclined direction and the direction to set the light directivity of the transmission screen are about the same.

Accordingly, the projection light from the projector can be reliably introduced into the transmission screen and light from any other direction can be reflected.

The projection display of an exemplary aspect of the invention may include the reflection screen.

BRIEF DESCRIPTION OF THE DRAWINGS

FIG. 4 is a schematic to show the use state of the projection display shown in FIG. 1;

FIG. 5 is a schematic to show a screen of the projection display shown in FIG. 1;

FIG. 6 is a schematic to show a component of the screen shown in FIG. 5;

FIG. 11 is a schematic to show a modification of the screen shown in FIG. 5;

FIG. 13 is a schematic to show a modification of the screen shown in FIG. 5;

FIG. 16 is a schematic to show a projection display according to a second exemplary embodiment of the invention;

FIG. 17 is a schematic to show the projection display according to the second exemplary embodiment of the invention;

FIG. 18 is a schematic to show the projection display according to the second exemplary embodiment of the invention;

FIG. 19 is a schematic to show a storage structure of a mirror of the projection display;

FIG. 20 is a schematic to show another storage structure of a mirror of the projection display;

FIG. 21 is a schematic to show another storage structure of a mirror of the projection display;

FIG. 23 is a schematic to show the function of the projection display shown in FIG. 22.

DETAILED DESCRIPTION OF EXEMPLARY EMBODIMENTS

A projection display of an exemplary aspect of the invention will be discussed in detail based on exemplary embodiments shown in the accompanying drawings. The invention is not limited to the specific exemplary embodiments. Components of exemplary embodiments described later can be or are easily replaced by those skilled in the art.

First Exemplary Embodiment

Figure 1:
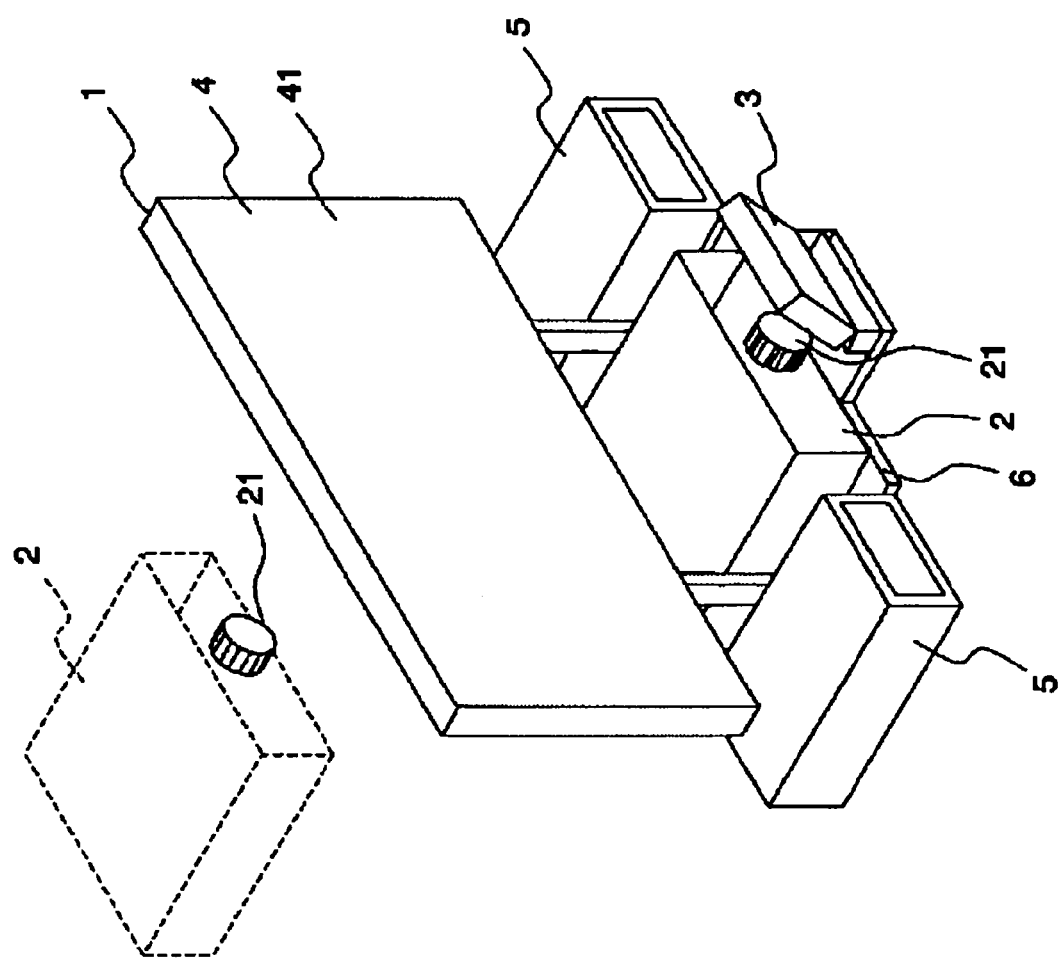
FIG. 1 is a schematic to show a projection display according to a first exemplary embodiment of the invention.
Figure 2:
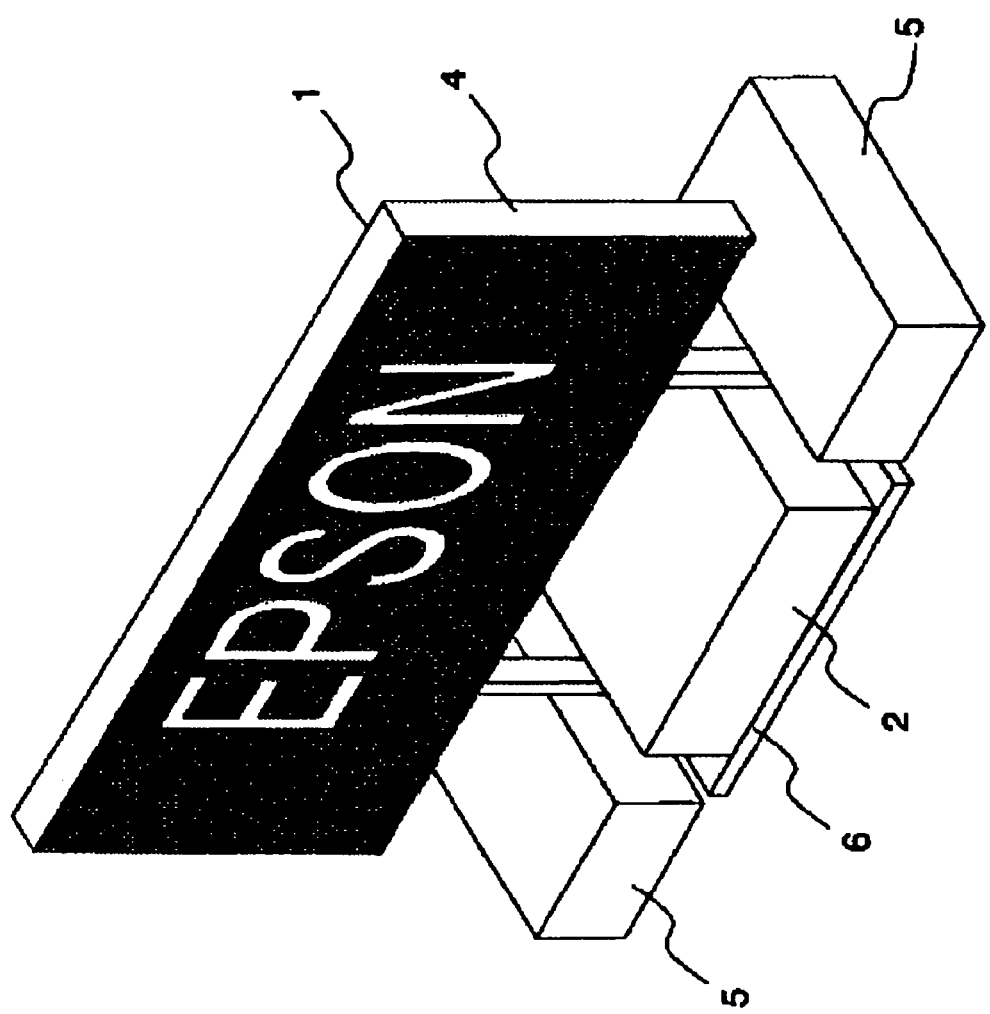
FIG. 2 is a schematic to show the use state of the projection display shown in FIG. 1.
Figure 3:
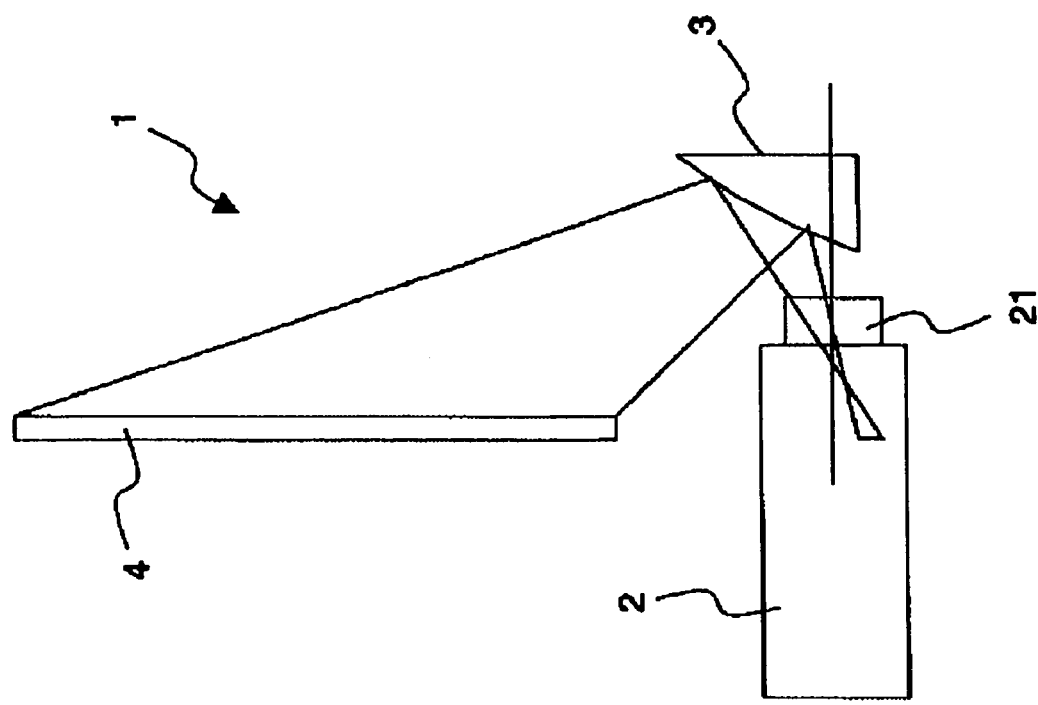
FIG. 3 is a schematic to show the use state of the projection display shown in FIG. 1.

FIG. 1 is a schematic to show a projection display according to a first exemplary embodiment of the invention. FIGS. 2 to 4 are schematics to show the use states of the projection display shown in FIG. 1. FIGS. 2 and 3 show the use state of the projection display in a rear projection mode. FIG. 4 shows the use state of the projection display in a front projection mode. The projection display 1 has a projector 2, a mirror 3, a screen having a light transmission property (transmission screen) 4, speakers 5 and 5, a frame 6, and a reflection screen 9.

The screen 4, the projector 2, and the mirror 3 are exposed to the outside.

The projector 2 has an internal image display device and enlarges projection light applied to a display image by the image display device to project the light. The projector 2 has a projection lens in a projection light emission section 21 and enlarges projection light through the projection lens to project the light. The projector 2 is installed detachably on the frame 6. To project light in the rear mode, the projector 2 is installed on the frame 6 for use. To project light in the front mode described later, the projector 2 is detached from the frame 6 for use.

To project light in the rear mode described later, the mirror 3 reflects projection light from the projector 2 and introduces the light into the rear of the screen 4. The mirror 3 is installed detachably on the frame 6 and is placed at the front of the emission section 21 of the projector 2. The mirror 3 has an aspheric structure to reflect projection light applied to the lower side of a display image and projection light applied to the upper side alternately at a different curvature. Accordingly, the mirror 3 makes a keystone correction to the display image and projects the correct rectangular display image onto the screen 4.

The screen 4 receives projection light from the projector 2 and displays a display image on the surface. The screen 4 is fixed at feet to the frame 6. To project light in the rear mode, the screen 4 allows projection light from the rear to pass through to display a display image (transmission screen). In the description to follow, the front of the screen 4 means the face on the side where the user sees the display image, and the rear means the face on the opposite side.

The speakers 5 and 5 are connected to the projector 2 in a wired or wireless manner to output audio applied to the display image at the use time. The left and right speakers 5 and 5 are paired and are fixed to the frame 6. To project light in the rear mode, the projector 2 is placed between the speakers 5 and 5.

The frame 6 is a base on which the projector 2, the mirror 3, the screen 4, and the speakers 5 and 5 are installed. The frame 6 has a support structure (support mechanism) capable of detachably retaining the projector 2. The support structure of the frame 6 includes, for example, (1) structure where the projector 2 is slidably inserted into the frame 6 having a guide section for installation and (2) structure where the projector 2 is held in the frame 6 having a holding section for installation (not shown). The support structure of the projector 2 can be selected arbitrarily within the scope obvious for those skilled in the art.

To use the projection display 1 in the rear projection mode, the projector 2 is retained by the frame 6 for installation (see FIG. 2). To project light in the rear mode, the projector 2, the mirror 3, and the screen 4 are installed in one piece. Projection light from the projector 2 is reflected on and introduced by the mirror 3 and is projected onto the screen 4 from the rear thereof (see FIG. 3). The projection light passes through the screen 4, whereby a display screen is provided on the front of the screen 4, enabling the user to see the image.

To use the projection display 1 in the front projection mode, the projector 2 is detached from the frame 6 and is placed at the front of the separately provided reflection screen 9 to reflect projection light from the front and displaying a display image (see FIG. 4). To project light in the front mode, the projector 2 is detached from the screen 4 and is installed in any desired place. Projection light is projected from the projector 2 directly onto the reflection screen 9 to display a display image on the reflection screen 9. To project light in the front mode, projection light may be projected onto the reflection screen 9 to display an image thereon as described above, or an image may be displayed on a display target, such as a wall of a room or another screen (not shown). Accordingly, an image can be displayed in any desired display size in any desired place.

Screen

Figure 7:
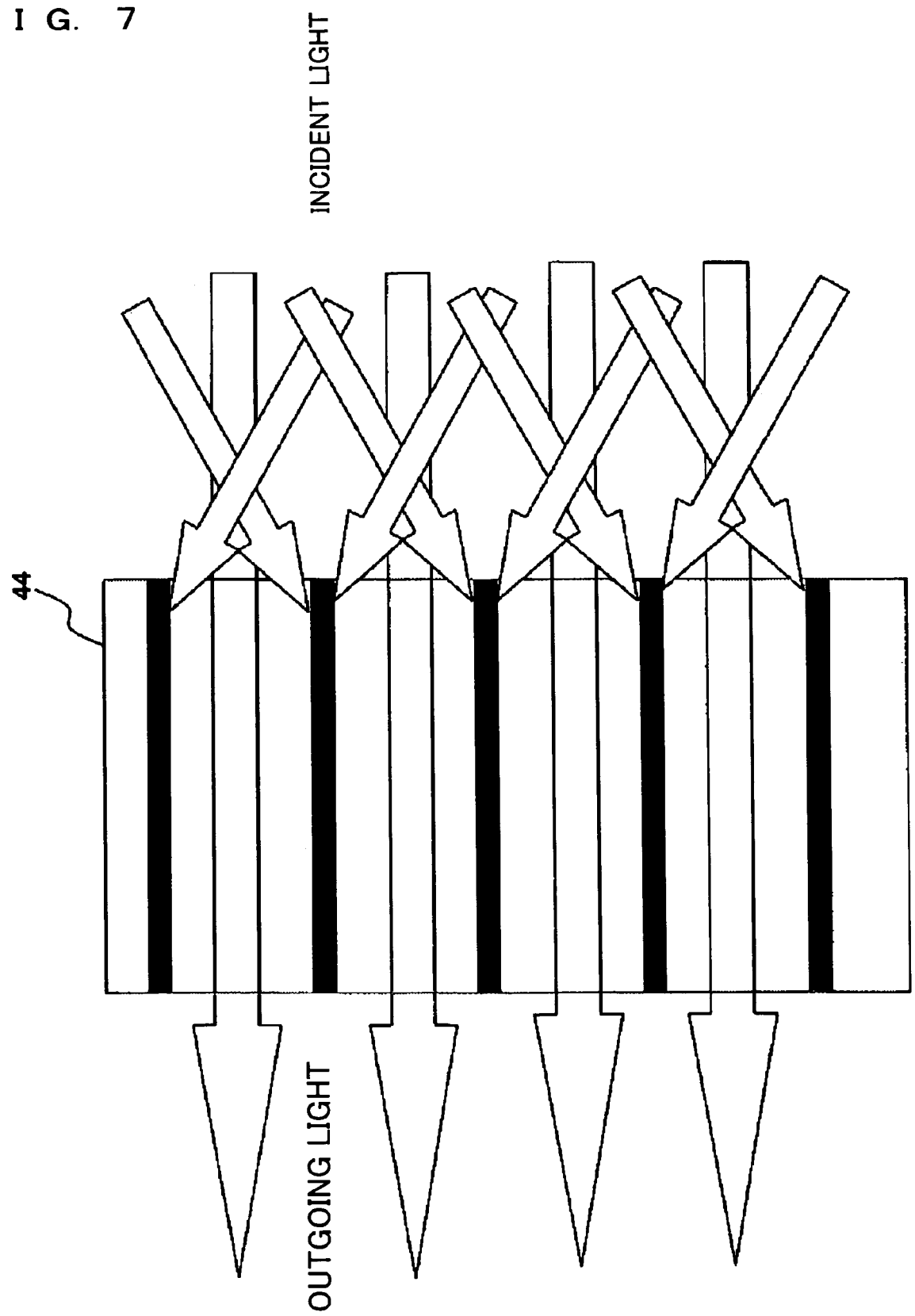
FIG. 7 is a schematic to show a component of the screen shown in FIG. 5.

FIG. 5 is a schematic to show the screen of the projection display shown in FIG. 1, and FIGS. 6 and 7 are schematic representations to show components of the screen shown in FIG. 5. FIG. 6 shows the function of a rear layer 41, and FIG. 7 shows the function of a front layer 44.

The screen 4 has the rear layer 41, an optical axis conversion layer 42, a light diffusion layer 43, and the front layer 44 deposited in this order. The screen 4 is characterized in that the layer having light directivity (rear layer 41) is placed at the rear, thereby allowing projection light introduced by the mirror 4 mainly to pass through and reflecting outside light other than the projection light to exclude the outside light.

The rear layer 41 is implemented as a sheet member or a film member having light directivity to form the rear of the screen 4. The rear layer 41 has the light directivity to allow light incident at a specific incidence angle mainly to pass through and reflecting or absorbing light incident at any other incidence angle (see FIGS. 5 and 6). The rear layer 41 has the light directivity set so as to incline at a predetermined angle with respect to a plane (ground).

The light directivity setting angle of the rear layer 41 (direction) and the projection direction of projection light of the projector 2 (inclination angle) are about the same.

In the exemplary embodiment, the rear layer 41 is placed with the light directivity setting direction directed toward the side of the mirror 3 in a state in which the screen 4 is installed on the frame 6. The rear layer 41 is not limited; for example, a microlouver, etc., may be used preferably.

The optical axis conversion layer 42 is implemented as a sheet member or a film member having an optical axis conversion characteristic and is deposited on the front of the rear layer 41. The optical axis conversion layer 42 has the optical axis conversion characteristic to convert the optical axis of incident light (projection light) into a specific direction. The optical axis conversion layer 42 is not limited; for example, a hologram sheet, a microprism, a microfiber, a Fresnel lens, etc., may be used.

The light diffusion layer 43 is implemented as a sheet member or a film member having a light diffusion characteristic and is deposited on the front of the rear layer 41. The light diffusion layer 43 has the light diffusion characteristic to diffuse incident light (projection light). The light diffusion layer 43 is not limited; for example, a lenticule, a diffusion sheet, etc., may be used.

The front layer 44 is implemented as a sheet member or a film member having light directivity and is deposited on the front of the light diffusion layer 43 to form the display surface of the screen 4. The front layer 44 is placed so that the light directivity setting direction becomes roughly perpendicular to the display surface of the screen 4 (see FIGS. 5 and 7). The front layer 44 has a function of absorbing outside light, thereby suppressing reflection of outside light on the display surface of the screen 4 and enhancing the ease to see a display screen. The front layer 44 is not limited; for example, a microlouver, etc., may be used. The front layer 44 may be a flat absorption layer of black stripe.

To project light in the rear mode, in the screen 4, projection light is introduced by the mirror 3 and is incident on the rear layer 41 from the rear (see FIG. 5). At this time, light (outside light) other than the light incident at a specific angle (mainly, projection light) is reflected or absorbed by the rear layer 41. The projection light passes through the rear layer 41 and is incident on the optical axis conversion layer 42 through which the optical axis of the projection light is converted into the direction roughly perpendicular to the plane of the screen 4. The projection light is incident on the light diffusion layer 43 and is diffused and the light conforming to the directivity of the front layer 44 passes through the front layer 44 and is emitted to the front of the screen 4. Then, a display image is formed on the screen 4.

As described above, according to the projection display 1, the projector 2 can be attached to and detached from the frame 6, so that the user can select the rear or front projection mode in response to the use scene as desired. For example, when the user appreciates an image on a large screen, the front projection mode is selected. When the user appreciates an image on a comparatively small screen, the rear projection mode is selected. As compared with the case where the user purchases one projection display operating in the front projection mode and one projection display operating in the rear projection mode and installs them, the single projection display 1 enables the user to use both the front projection mode and the rear projection mode, so that the display introduction cost can be reduced and the installation space can be saved. To project light in the front mode, the projector 2 is detached from the frame 6 for use, so that the user can select the installation positions of the projector 2 and the screen 4 as desired in response to the layout of the room, etc.

According to the projection display 1, the projector 2 can be attached to and detached from the frame 6, so that at the transporting time, etc., the projector 2 can be detached from the frame 6 for transportation, whereby it is made easy to transport the display.

According to the projection display 1, the screen 4 has the rear layer 41 having the light directivity and when the projection display 1 is used in the rear projection mode, the rear layer 41 allows projection light from the mirror 3 to pass through and reflects outside light, so that the contrast of the display image is enhanced. Accordingly, a cabinet as in the projection display in the related art becomes unnecessary and the screen 4, the projector 2, and the mirror 3 can be exposed to the outside. Further, the whole display can be downsized and the installation space can be saved. Accordingly, a large number of advantages of weight reduction, compacting, and slimming of the display, facilitating of commodity variations of the screen sizes, simplification of move, facilitating of installation, decrease in environmental load, and the like can be provided. As the cabinet is omitted, the cooling efficiency of the display is enhanced, so that the heat exhaust mechanism and the cooling structure (for example, cooling fan and heat sink) can be simplified. Since the cabinet is not required, a portable projection display 1 as described later in a second exemplary embodiment can be realized.

To project light in the rear mode, in the projection display 1, the projector 2 is fixed to the frame 6, the mirror 3 is placed at the front of the projector 2, the screen 4 is placed with the screen surface upright above the projector 2, and projection light from the projector 2 is bent roughly like a letter L (by reflection) through the mirror 3 in the side view and then is projected onto the rear of the screen 4. (See FIGS. 1 to 3.) According to the composition, the projector 2, the mirror 3, and the screen 4 are placed compactly, so that the installation space of the display can be saved to project light in the rear mode. Further, to project light in the rear mode, the speakers 5, 5 are placed on both sides of the projector 2, so that the installation space of the display can be furthermore saved. In the exemplary embodiment, the projector 2 is installed horizontally to project light in the horizontal direction as the light is bent at an acute angle (less than 90°) (by reflection) by the mirror 3, but the installation state is not limited to it. Specifically, if the product is to be installed on a wall as a slim body, the projector 2 may be installed vertically to project light vertically upward, the light may be bent at an obtuse angle (more than 90°) (by reflection) by the mirror 3, and the reflected light may be projected onto the rear of the screen 4. In this case, the product can realize a small thickness close to a usual flat-panel display (plasma display, direct-view liquid crystal display, etc.,) although it is rear projection.

First Modification

Figure 8:
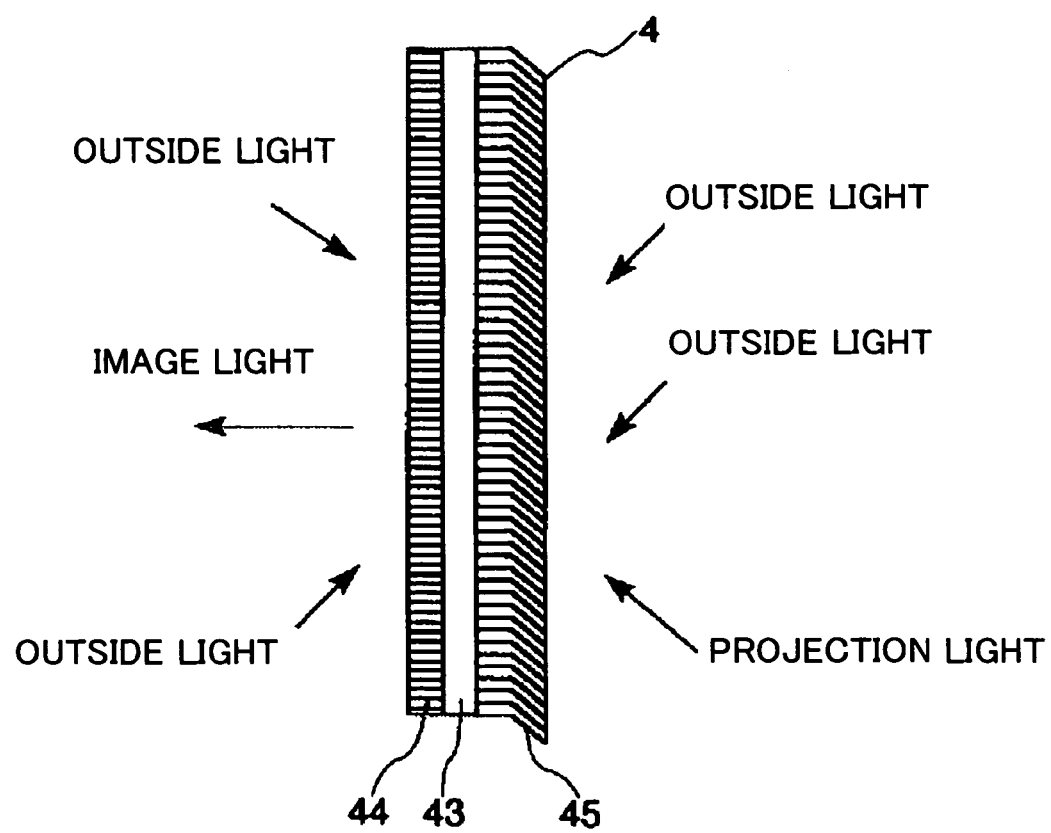
FIG. 8 is a schematic to show a modification of the screen shown in FIG. 5.
Figure 9:
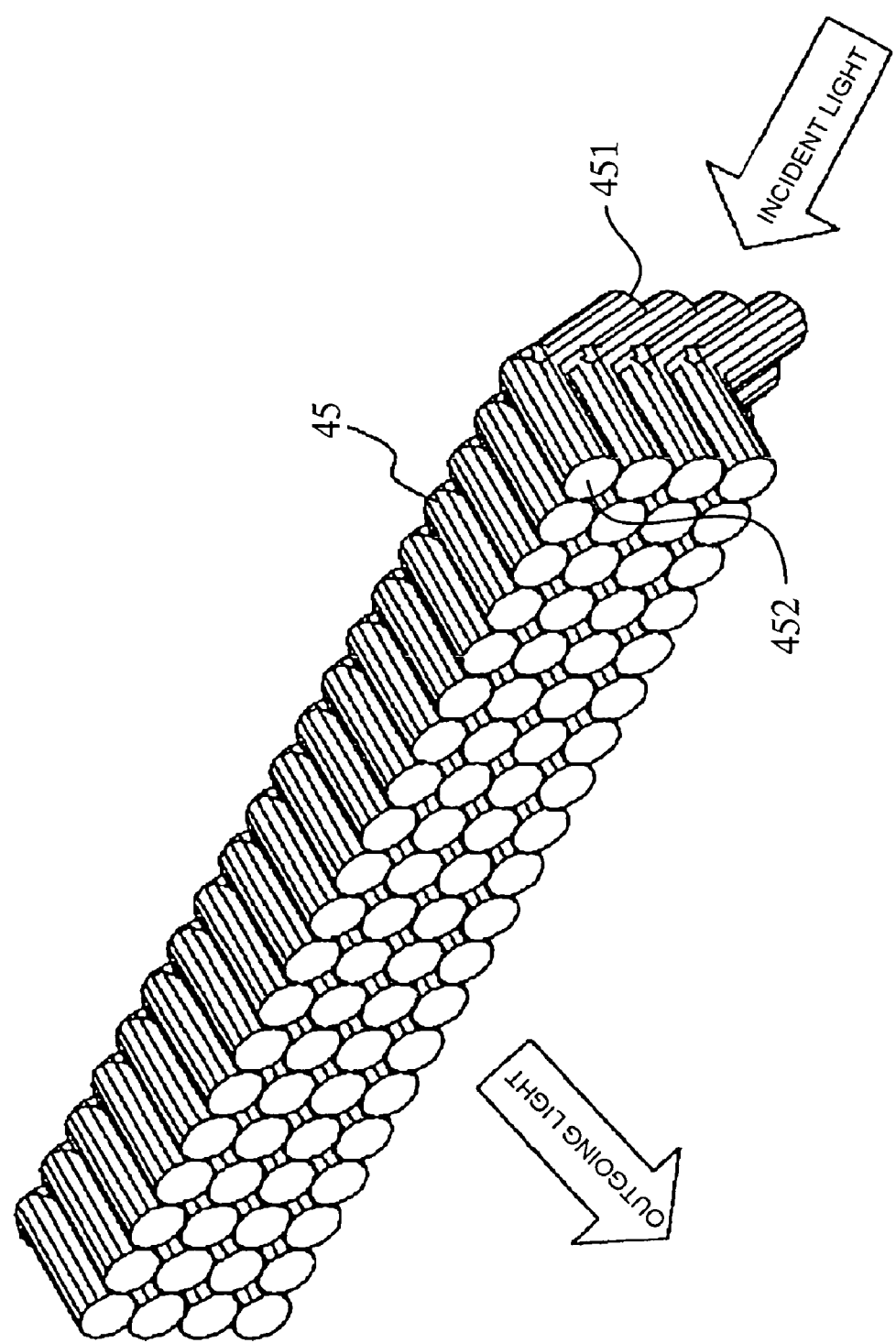
FIG. 9 is a schematic to show the main part of the screen shown in FIG. 8.
Figure 10:
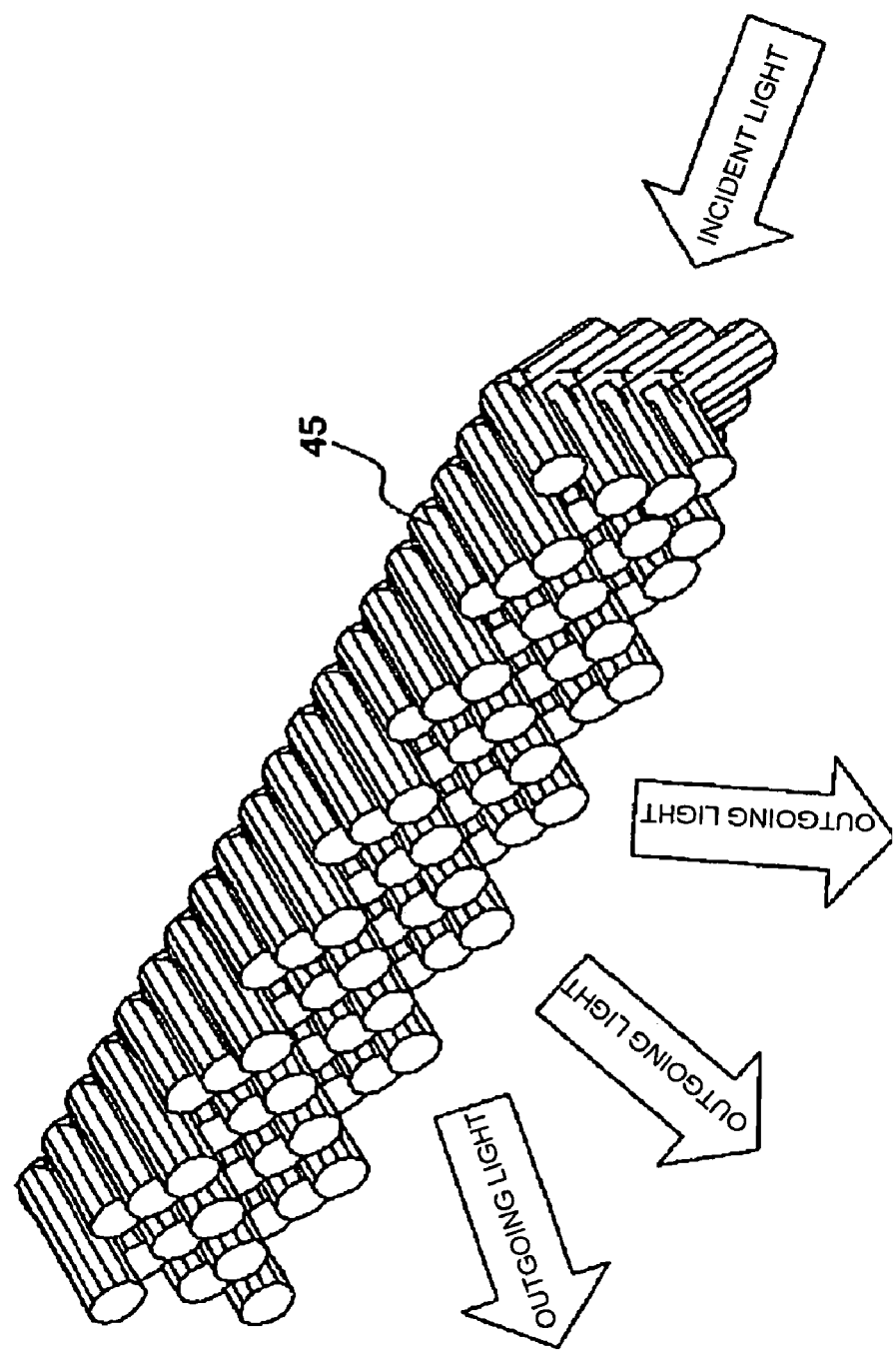
FIG. 10 is a schematic to show the main part of the screen shown in FIG. 8.

FIG. 8 is a schematic to show a modification of the screen shown in FIG. 5. FIGS. 9 and 10 are schematics to show the main part of the screen shown in FIG. 8. The screen 4 is characterized in that the rear layer 41 and the optical axis conversion layer 42 are implemented as a single optical waveguide 45. Specifically, the screen 4 has the optical waveguide 45, the light diffusion layer 43, and the front layer 44 deposited in this order.

The optical waveguide 45 is a member to guide light incident from an entrance part 451 and emitting the light from an exit part 452 and has light directivity and an optical axis conversion characteristic. Specifically, the optical waveguide 45 takes in light (projection light) only from a specific direction through the entrance part 451, guides the light, and emits the light in a predetermined direction from the exit part 452. The optical waveguide 45 forms the rear of the screen 4 and is installed with the opening direction of the entrance parts 451 directed toward the side of the mirror 3 (see FIGS. 8 and 9). The optical waveguide 45 is bent or curved halfway and has the exit parts 452 placed perpendicularly to the plane of the light diffusion layer 43. The optical waveguide 45 is implemented as a bundle of curved or bent optical fibers, for example.

To project light in the rear mode, in the screen 4, projection light is introduced from the rear by the mirror 3 and is incident on the optical waveguide 45 (see FIG. 8). At this time, only the projection light incident at a specific angle is introduced into the optical waveguide 45 from the entrance part 451 and any other light (outside light) is reflected or absorbed at the entrance part 451. The projection light proceeds while being totally reflected on the optical waveguide 45 and is emitted from the exit part 452 to the light diffusion layer 43. The projection light is diffused in the light diffusion layer 43 and is incident on the front layer 44, whereby a display image is formed on the screen 4.

According to the screen 4, the rear layer 41 and the optical axis conversion layer 42 are implemented as the single optical waveguide 45, so that the configuration of the screen 4 is simplified.

In the screen 4, if the optical waveguide 45 is implemented as a bundle of optical fibers (see FIGS. 8 and 9), an optical absorption agent may be filled into the space between the optical fibers (not shown). Accordingly, outside light other than the projection light is effectively intercepted on the rear of the screen 4 (optical waveguide 45), so that the contrast of the display image is more enhanced.

In the screen 4, the optical waveguide 45 has the exit parts 452 aligned (see FIGS. 8 and 9), but the invention is not limited to it and the optical waveguide 45 may have the exit parts 452 unaligned (see FIG. 10). For example, in the optical waveguide 45 shown in FIG. 10, the exit parts 452 are arranged unevenly at three stages of the height. In the configuration, projection light is diffused in the vicinity of each exit part 452. Accordingly, it is also made possible to slim the light diffusion layer 43 or omit the light diffusion layer 43 (for example, the screen 4 has the optical waveguide 45 shown in FIG. 10 and the front layer 44 deposited on each other) (not shown).

Second Modification

Figure 12:
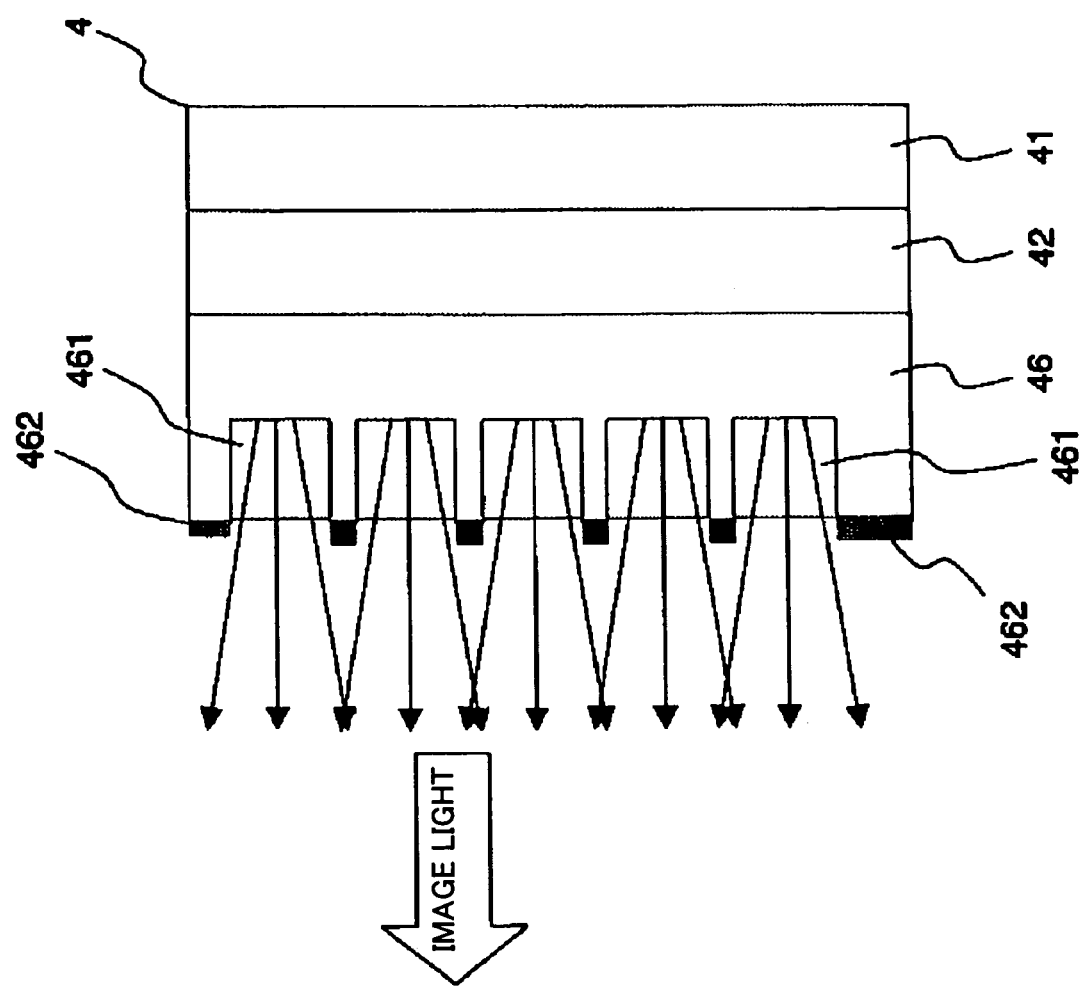
FIG. 12 is a schematic to show a modification of the screen shown in FIG. 5.
Figure 14:
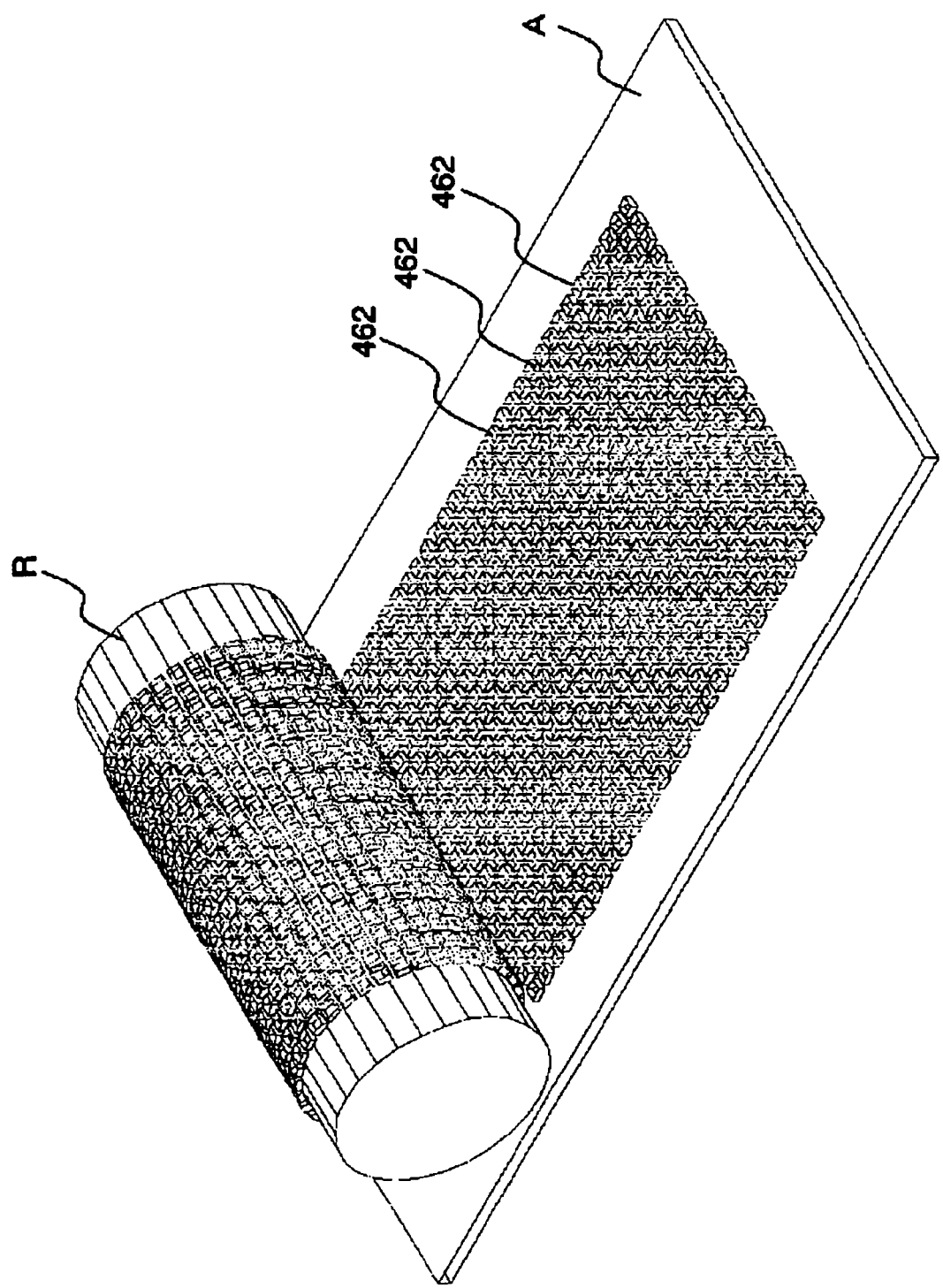
FIG. 14 is a schematic to show a manufacturing process of the screen in FIGS. 11 to 13.

FIGS. 11 to 13 are specifications to show a modification of the screen shown in FIG. 5. FIG. 14 is a schematic to show a manufacturing process of the screen shown in FIGS. 11 to 13. The screen 4 is characterized in that the light diffusion layer 43 and the front layer 44 are implemented as a single embossment layer 46. Specifically, the screen 4 has the rear layer 41, the optical axis conversion layer 42, and the embossment layer 46 deposited.

The embossment layer 46 is formed with a plurality of minute asperities 461 (emission pits) having an embossment shape on the front (see FIGS. 11 to 13). The embossment layer 46 is formed on each convex face (convex face of the asperity 461) with a black stripe 462. In the embossment layer 46, the bottom of the asperity 461 (bottom of each concave part) has a light diffusion function and the black stripe 462 has a light absorption function. The black stripes 462 are formed by coloring the surface of the embossment layer 46 in black by printing, etc.

To project light in the rear mode, in the screen 4, projection light from the projector 2 is incident from the rear layer 41 and is incident on the embossment layer 46 from the rear through the optical axis conversion layer 42. Then, the projection light is diffused on the bottoms of the asperities 461 and is emitted forward from the emission pits (concave spaces of the asperities 461) (see FIG. 12), and a display image is formed on the screen 4. Outside light incident from the front of the screen 4 is absorbed in the black stripes 462 of the embossment layer 46. Accordingly, reflection of the outside light on the front of the screen 4 is suppressed and the ease to see a display screen and the display image contrast are enhanced.

According to the screen 4, the light diffusion layer 43 and the front layer 44 are implemented as the single embossment layer 46, so that the configuration of the screen 4 can be simplified.

In the screen 4, the black stripes 462 are formed only on the convex faces of the embossment layer 46, but the invention is not limited to it and the black stripes 462 may be formed on the convex faces and the inner sides (inner sides of the concave parts except the bottoms of the concave parts) of the asperities 461 (see FIG. 13). Accordingly, reflection of the outside light on the front of the screen 4 is suppressed more effectively, so that the ease to see a display screen is furthermore enhanced.

In the screen 4, the embossment layer 46 is made of flat resin material A formed with the asperities 461. Specifically, a roll stamper R having an embossing die is rolled on the flat resin material A by a predetermined pressure, whereby the asperities 461 of the embossment layer 46 are formed (see FIG. 14). In the screen manufacturing method, a large number of asperities 461 can be formed easily.

Third Modification

In the projection display 1, only the single mirror 3 is installed (see FIGS. 1 and 3). In the configuration, to project light in the rear mode, projection light from the projector 2 is once reversed by the mirror 3 and further a display image is formed from the rear of the screen 4, so that the display image unreversed left to right is provided on the screen 4 (see FIGS. 2 and 3). To project light in the front mode, the display image unreversed left to right is displayed on the screen 4 as it is. Accordingly, the display image unreversed left to right can be provided on the screen 4 regardless of whether light is projected in the rear or front mode.

However, the invention is not limited to it and a plurality of mirrors 3 may be installed. For example, if an odd number of mirrors 3 are installed, a display image unreversed left to right is displayed on the screen 4 as with the case where the single mirror 3 is installed. An even number of mirrors 3 may be installed in response to the use of the projection display 1. In such a configuration, when the projection mode is switched between the rear and front modes, a display image reversed left to right may be provided on the screen 4 depending on the number of the installed mirrors 3, the optical path condition of projection light, etc. In such a case, the image scanning direction is controlled by the image display device in the projector 2 to adjust left to right reversal/non-reversal of the image. Alternatively, display data may be controlled by a command of a display controller, etc., to adjust left to right reversal/non-reversal of the image. Accordingly, the display image unreversed left to right can be provided as the adjustment is made.

Fourth Modification

In the projection display 1, the projector 2 has one projection lens (one-lens system) (not shown). In the configuration, three primary colors of projection light are combined at the stage where the projection light is incident on the projection lens. Thus, in the one-lens system, the projection light is projected onto the screen 4 through a common optical path after it passes through the projection lens and therefore if the projection distance to the screen 4 changes, the images of the three primary colors are not shifted in the projection.

In contrast, a configuration where separate projection lenses are provided in a one-to-one correspondence with the three primary colors and three primary colors of projection light are combined on a screen (three-lens system) has been disclosed. In the configuration, three primary colors of projection light are projected onto the screen 4 through different optical paths after passing through the projection lenses and therefore if the projection distance to the screen 4 changes, the images of the three primary colors are shifted. Thus, in the configuration, complicated convergence adjustment (adjustment to correctly superpose the images of the three primary colors on each other) becomes necessary. This adjustment is required particularly for the front projection mode in which the projection distance changes.

In this point, the projection display 1 is preferred because the projector 2 adopts the one-lens system and when light is projected in the front mode, a mechanism to make the above-mentioned convergence adjustment is not required. However, the invention is not limited to this. The projector 2 may adopt the three-lens system by installing a related art convergence adjustment mechanism.

Fifth Modification

In the projection display 1, the number of liquid crystal panels (not shown) contained in the projector 2 is not limited. Therefore, the projector 2 may have only a single liquid crystal panel or may have more than one liquid crystal display panel. Specifically, the projector 2 may adopt a projection system of a monochrome image or a color image displayed on a single liquid crystal panel or may adopt a projection system of a composite image into which a plurality of display images are combined, for example. As the projection systems, related art systems can be adopted within the scope obvious for those skilled in the art.

Sixth Modification

In the projection display 1, as the image display device of the projector 2, a related art device can be adopted within a scope obvious for those skilled in the art. For example, as the image display device of the projector 2, a device to project an image on a liquid crystal display panel as mentioned above may be adopted or a reflection MEMS device, such as a DMD (Digital Micromirror Device) or a reflection microliquid crystal device called LCOS (Liquid Crystal On Silicon) for scale-up projection may be adopted.

Seventh Modification

Figure 15:
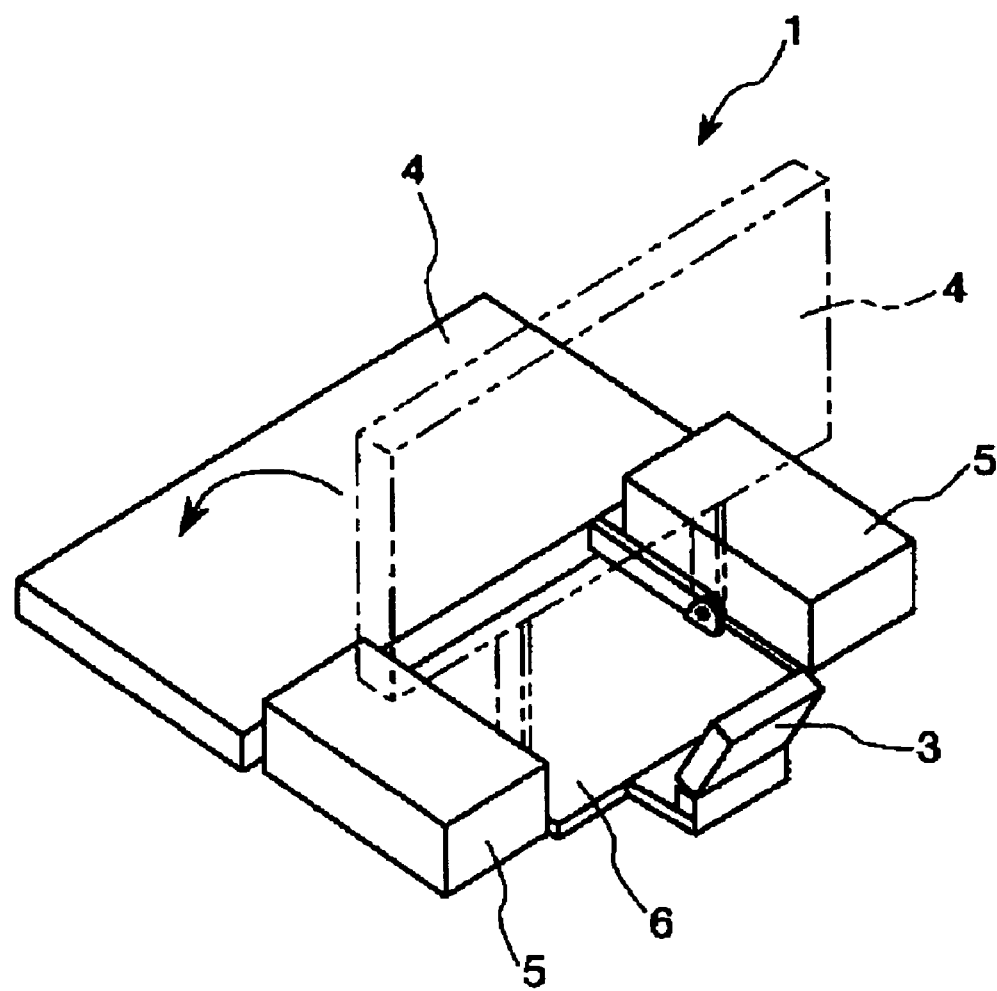
FIG. 15 is a schematic to show the function of the projection display shown in FIG. 1.

In the projection display 1, the screen 4 has the feet joined to the frame 6 by pin joint, etc., for example. Specifically, the screen 4 is joined to the frame 6 so that it can fall down to the frame 6. The screen 4 can be folded relative to the frame 6 when not in use or when being transported (see FIG. 15). Accordingly, for example, to detach the projector 2 from the frame 6 and display an image on a wall at the rear of the screen 4 in the front projection mode, the screen 4 can be folded so that it is placed out of the optical path of projection light of the projector 2. The whole display can be compacted.

In the projection display 1, the screen 4 may be installed so that it can be attached to and detached from the frame 6 (not shown). Accordingly, for example, to display an image on a wall at the rear of the screen 4 in the front projection mode, the screen 4 can be detached from the frame 6 so that it is placed out of the optical path of projection light from the projector 2 and the projection display 1 can be easily switched between the front and rear modes.

At the transport time, etc., the screen 4 can be detached from the frame 6 and can be transported separately, so that transporting the display is facilitated.

Eighth Modification

In the projection display 1, the mirror 3 may be installed so that it can be attached to and detached from the frame 6. Accordingly, to project light in the front mode, the mirror 3 can be detached from the frame 6 so that it is placed out of the optical path of projection light from the projector 2 and the projection display 1 can be easily switched between the front and rear modes.

At the transport time, the mirror 3 can be detached from the frame 6 (projector 2 and screen 4) and can be transported separately, so that transporting the display is facilitated.

Second Exemplary Embodiment

FIGS. 16 to 18 are schematics to show a projection display according to a second exemplary embodiment of the invention. FIGS. 16 and 17 are schematics of a projection display 1 to project light in a rear mode. FIG. 18 is a schematic of the projection display 1 to project light in a front mode. FIGS. 19 to 21 are schematics to show storage structures of a mirror of the projection display shown in FIGS. 16 to 18. In FIGS. 19 to 21, the projection display 1 is viewed from the rear thereof.

The projection display 1 of the second exemplary embodiment will be discussed centering on the difference from that of the first exemplary embodiment and similar items will not be discussed again.

The projection display 1 is characterized in that a mirror 3, a screen 4, and a frame 6 are formed integrally with a projector 2. The projection display 1 has a configuration wherein the projector 2 corresponds to the main unit of an existing notebook personal computer (notebook PC) and the screen 4 corresponds to a liquid crystal display.

The mirror 3 is held on the frame 6 and is installed on the bottom of the projector 2 through the frame 6. To project light in the rear mode, the mirror 3 is installed so that the mirror surface of the mirror 3 is positioned at the front of an emission section 21 of the projector 2 (see FIG. 16). The mirror 3 is installed so that it can be stored in the frame 6 as the mirror 3 is slid (see FIGS. 19 to 21). Specifically, the mirror 3 is slid along a guide groove provided on the frame 6 and is stored in the face of the frame 6. The storage structure of the mirror 3 is not limited to it.

The screen 4 is a transmission screen having a plate-like structure and is joined to the top face of the projector 2 via hinges 7 and 7 so that it can be opened and closed (see FIGS. 16 and 18). Specifically, the screen 4 and the projector 2 are joined foldably. The joint structure is not limited to the joint structure with the hinges 7 and any desired joint structure is selected within the scope obvious for those skilled in the art.

In the projection display 1, to project light in the rear mode, the screen 4 is placed with the display surface upright above the projector 2 as a lid of a notebook PC (liquid crystal display) is opened upright. Projection light from the projector 2 is introduced by the mirror 3 and is projected onto the screen 4 from the rear to display a display image on the screen 4 (see FIG. 17).

To project light in the front mode, the screen 4 is folded down onto the top face of the projector 2 with each hinge 7 as a rotation shaft as a lid of a notebook PC is closed (see FIG. 18). At this time, the mirror 3 is slid to the frame 6 and is stored in the face of the frame 6 (see FIGS. 19 to 21). In this state, the projection display 1 is used as the projector 2 to project projection light to display an image on a wall of a room, etc.

According to the projection display 1, similar advantages to those of the projection display 1 of the first exemplary embodiment described above can be provided.

In the projection display 1 of the second exemplary embodiment, to project light in the rear mode, the screen 4 is placed upright on the projector 2 so that it is positioned on the optical path of projection light of the projector 2; to project light in the front mode, the screen 4 is folded down onto the projector 2 so that it is placed out of the optical path of projection light of the projector 2, whereby the projection display 1 can be easily switched between the front and rear projection modes. The projection display 1 does not require a cabinet as with the projection display in the related art and thus is compact and space is saved.

According to the projection display 1, the mirror 3 and the screen 4 are formed integrally with a projector 2. Thus, the projection display 1 is small and can be easily transported as compared with the projection display in the related art. In the projection display 1, the screen 4 is joined to the projector 2 so that it can be opened and closed, and the whole display can be folded. Accordingly, at the non-use time, at the transport time, or to project light in the front mode, the display can be folded and can be compacted.

Particularly, in the projection display 1, as in the projection display 1 of the first exemplary embodiment described above, the screen 4 has the rear layer 41 having light directivity on the rear and to project light in the rear mode, the rear layer 41 enhances the contrast of the display image. Therefore, the projection display 1 can enhance the viewability of the display image although it does not have a cabinet as in the projection display in the related art.

First Modification

A projection display in a related art having a plurality of mirrors to introduce projection light from a projector into a screen through the mirrors is known (not shown). In the configuration, the longer the passage path of projection light, the larger the cross-sectional area of the projection light. Thus, a mirror of a large area responsive to the cross-sectional area of the projection light becomes necessary.

Therefore, in the configuration where the mirror 3 is slid for storage as in the projection display 1, it is difficult to slide such a mirror of a large area for storage. For example, problems of upsizing the storage mechanism of the mirror 3 (frame 6), being unable to provide the storage location, etc. occur.

In this point, in the projection display 1, only the single mirror 3 is installed and only the single mirror 3 is stored (see FIGS. 16 to 21). Therefore, the storage mechanism of the mirror 3 can be simplified and the mirror 3 can be stored compactly. Since the mirror 3 is easily stored, the projection display 1 can be easily switched between the rear and front projection modes.

In the projection display 1, the mirror 3 is stored in the frame 6, but the invention is not limited to it. For example, the mirror 3 may be stored in the projector 2 (not shown). In the projection display 1, the mirror 3 may be installed so that it can be attached to and detached from the frame 6. Accordingly, at the transport time, the mirror 3 can be detached from the frame 6 (projector 2 and screen 4) and can be transported, so that transporting the display is facilitated.

Second Modification

Figure 22:
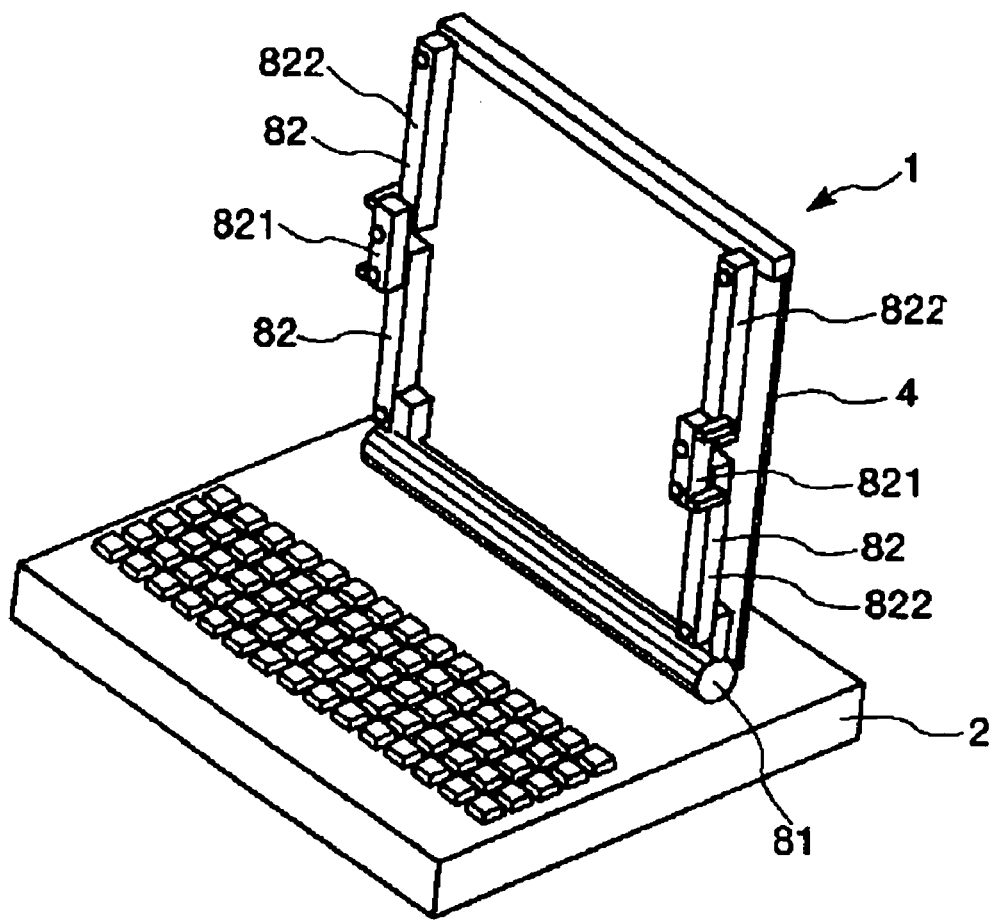
FIG. 22 is a schematic to show a modification of the projection display shown in FIGS. 16 to 18.
Figure 24:
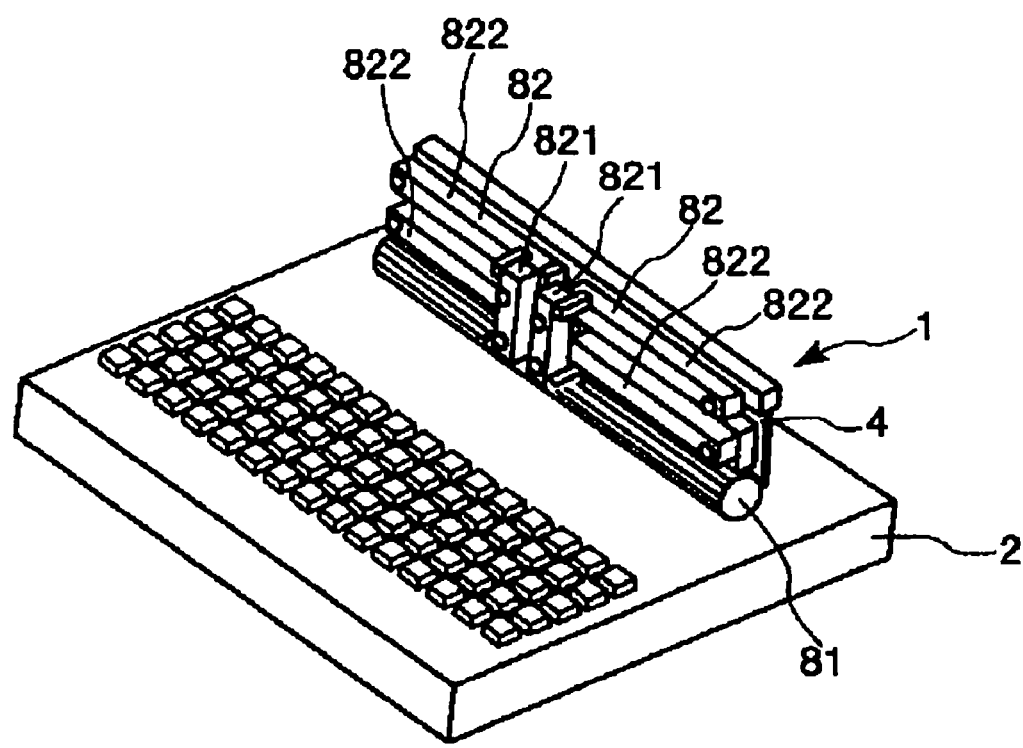
FIG. 24 is a schematic to show the function of the projection display shown in FIG. 22.

FIG. 22 is a schematic to show a modification of the projection display shown in FIGS. 16 to 18. FIGS. 23 and 24 are schematic representations to show the function of the projection display shown in FIG. 22.

In the projection display 1, the screen 4 is implemented as a sheet-like member having flexibility. A storage section 81 and a support section 82 are installed on the projector 2. The storage section 81 has a structure capable of rolling the screen 4 for storage therein and is installed on the top face of the projector 2. The support section 82 has a structure capable of supporting the screen 4 in an unrolling state above the projector 2 and is installed on both sides of the screen 4 as a pair of the left and right support sections.

Specifically, each support section 82 is a unit of two rods 822 and 822 connected by a hinge 821, and one end of each rod 822 is fixed to one end of the screen 4. The hinge 821 has a lock mechanism to enable the support section 82 to be fixed with the rods 822 arranged in line. The support section 82 can support the screen 4 in an unfolded state as one rod (see FIG. 22).

In the projection display 1, when not in use, during transport, or to project light in the front mode, the screen 4 is rolled into the storage section 81 for storage therein (the screen 4 is in a storage state) (see FIG. 24). In this state, a keyboard section is exposed, enabling the user to operate the keyboard even when light is projected in the front mode. To project light in the rear mode, the screen 4 is pulled out from within the storage section 81 and is unfolded on the projector 2 (the screen 4 is in an unfolded state) (see FIGS. 22 to 24). At this time, the screen 4 is supported by the support sections 82 and 82 in the unfolded state. Projection light from the projector 2 is introduced by the mirror 3 and is projected onto the screen 4 unfolded on the projector 2. Accordingly, a display image is formed on the screen 4.

According to the projection display 1, the screen 4 is formed of a flexible member and thus can be unfolded at the use time and can be rolled for storage at the non-use time, so that the screen 4 can be unfolded and stored as desired in response to the use situation. Since the screen 4 can be easily unfolded and stored, the projection display 1 can be easily switched between the rear and front projection modes.

In the projection display 1, the screen 4 is unfolded and stored in an up and down direction relative to the projector 2 (for example, a vertical direction in a state in which the projector 2 is installed on a desk). However, the invention is not limited to this. The storage section 81 may be installed with the length direction upright on the top of the projector 2 and the screen 4 may be unfolded and stored from side to side (horizontal direction) relative to the projector 2.

In the projection display 1, the storage section 81 is installed on the projector 2 and the screen 4 is stored in the storage section 81 on the projector 2. However, the invention is not limited to this. The storage section 81 (and the support sections 82) may be installed so that it can be attached to and detached from the projector 2 and the screen 4 may be able to be removed together with the storage section 81 (and the support sections 82).

The screen 4 and the mirror 3 may be folded and stored automatically by a control section (not shown) incorporated in the projection display 1, but may be folded and stored manually.

In the exemplary embodiment described above, the screen 4 is folded, removed, and stored, whereby the projection display 1 is switched between the rear and front projection modes. However, the invention is not limited to this. The screen 4 may be moved in a predetermined direction to switch between the rear and front projection modes.

In the exemplary embodiment described above, the mirror 3 is removed and stored, whereby the projection display 1 is switched between the rear and front projection modes. However, the invention is not limited to this. The mirror 3 may be moved in a predetermined direction to switch between the rear and front projection modes.

The projection display 1 of an exemplary aspect of the invention has been described based on the exemplary embodiments shown in the accompanying drawings. But the invention is not limited to the exemplary embodiments. The components may be replaced with any desired components having similar functions. Any other desired component may be added to the invention.

The invention may be embodied by combining any two or more desired configurations (features) in the embodiments described above.

What is claimed is:

1. A projection display, comprising:
   a transmission screen having a light transmission property and including a rear layer having light directivity on the rear;
   a projector that projects projection light;
   a mirror to introduce projection light from the projector into the rear of the transmission screen;
   a frame to support the transmission screen, the projector, and the mirror;
   a support mechanism to support the projector so that the projector can be attached to and detached from the frame,
   the transmission screen, the projector, and the mirror being exposed to the outside,
   to project light in a rear mode, the projection light introduced by the mirror being allowed to pass through from the rear with the projector attached to the frame to display an image on the transmission screen,
   to project light in a front mode, the projection light from the projector being projected onto a reflection screen with the projector detached from the frame, thereby displaying an image on the reflection screen; and
   a screen switch to switch between a mode in which the transmission screen is positioned on an optical path of the projection light in the rear mode and a mode in which the transmission screen is placed out of the optical path of the projection light in the front mode.

2. The projection display as claimed in claim 1 the screen switch being a support mechanism to support the transmission screen so that the transmission screen can be attached to and detached from the frame.

3. The projection display as claimed in claim 1 the screen switch being a support mechanism to support the transmission screen so that the transmission screen can be folded relative to the frame.

4. The projection display as claimed in claim 1 the transmission screen having flexibility and the screen switch being a support mechanism to support the transmission screen so that the transmission screen can enter an unfolded state and a storage state.

5. The projection display as claimed in claim 1, further comprising:
   a support mechanism to support the mirror so that the mirror can be attached to and detached from the frame.

6. The projection display as claimed in claim 1 further comprising:
   a support mechanism to support the mirror so that the mirror is slid into the frame for storage.

7. The projection display as claimed in claim 1, the projection light being projected onto the transmission screen from a direction inclined at a predetermined angle and the inclined direction and the direction to set the light directivity of the transmission screen are about the same.

8. The projection display as claimed in claim 1 comprising:
   the reflection screen.

9. A projection display, comprising:
   a transmission screen having a light transmission property and including a rear layer having light directivity on the rear;
   a projector that projects projection light;
   a mirror to introduce projection light from the projector into the rear of the transmission screen;
   a frame to support the transmission screen, the projector, and the mirror; and
   a front/rear switch to switch between rear and front projection modes in which to project light in the rear mode, the projection light introduced by the mirror is allowed to pass through from the rear to display an image on the transmission screen and to project light in the front mode, the projection light from the projector is projected onto a reflection screen, thereby displaying an image on the reflection screen,
   the transmission screen, the projector, and the mirror being exposed to the outside, and
   a screen switch to switch between a mode in which the transmission screen is positioned on an optical path of the projection light in the rear mode and a mode in which the transmission screen is placed out of the optical path of the projection light in the front mode.

10. A projection display, comprising:
    a transmission screen having a light transmission property and including a rear layer having light directivity on the rear;
    a projector that projects projection light;
    a mirror to introduce projection light from the projector into the rear of the transmission screen;
    a frame to support the transmission screen, the projector, and the mirror,
    the transmission screen, the projector, and the mirror being exposed to the outside;
    a mirror switch to switch between a mode in which the mirror is positioned on an optical path of the projection light and a mode in which the mirror is placed out of the optical path of the projection light, wherein to project light in a rear mode, the mode in which the mirror is positioned on the optical path of the projection light being set by the mirror switch to allow the projection light introduced by the mirror to pass through from the rear to display an image on the transmission screen, and to project light in a front mode, the mode in which the mirror is placed out of the optical path of the projection light being set by the mirror switch to project the projection light from the projector onto a reflection screen, thereby displaying an image on the reflection screen; and a screen switch to switch between a mode in which the transmission screen is positioned on an optical path of the projection light in the rear mode and a mode in which the transmission screen is placed out of the optical path of the projection light in the front mode.

11. The projection display as claimed in claim 10 the mirror switch being a support mechanism to support the mirror so that the mirror can be attached to and detached from the frame and to project light in the front mode, the mirror being detached from the frame, thereby setting the mode in which the mirror is placed out of the optical path of the projection light and to project light in the rear mode, the mirror being attached to the frame, thereby setting the mode in which the mirror is positioned on the optical path of the projection light.

12. The projection display as claimed in claim 10 the mirror switch being a support mechanism to support the mirror so that the mirror can be stored in the frame and to project light in the front mode, the mirror being slid into the frame for storage, thereby setting the mode in which the mirror is placed out of the optical path of the projection light and to project light in the rear mode, the mode in which the mirror is positioned on the optical path of the projection light is set.

* * * * *